United States

Jacob

[11] 3,967,265

[5] June 29, 1976

[54] LIGHT GATING DISPLAY

[76] Inventor: Carlyle W. Jacob, 118 President Lane, Quincy, Mass. 02169

[22] Filed: Dec. 26, 1973

[21] Appl. No.: 428,425

Related U.S. Application Data

[63] Continuation-in-part of Ser. No. 168,048, Aug. 3, 1971, abandoned, which is a continuation-in-part of Ser. No. 724,661, March 18, 1968, abandoned, which is a continuation-in-part of Ser. No. 383,471, July 17, 1964.

[52] U.S. Cl. .................. 340/324 R; 340/366 B; 350/160 R
[51] Int. Cl.² ........................................ G08B 5/36
[58] Field of Search ............ 340/324 R, 366 B; 350/150, 160 R; 178/7.3 D

[56] References Cited
UNITED STATES PATENTS

| | | | |
|---|---|---|---|
| 2,481,621 | 9/1949 | Rosenthal | 178/7.5 D |
| 3,322,482 | 5/1967 | Harmon | 178/7.3 D |
| 3,507,551 | 4/1970 | Stetten | 178/7.5 D |
| 3,610,730 | 10/1971 | Goldberg | 350/147 X |
| 3,708,219 | 1/1973 | Forlini et al. | 350/160 R |
| 3,744,126 | 7/1973 | Forlini et al. | 350/150 |
| 3,788,729 | 1/1974 | Lowell et al. | 350/160 R |

*Primary Examiner*—David L. Trafton
*Attorney, Agent, or Firm*—Wolf, Greenfield & Sacks

[57] ABSTRACT

A display system employing a panel having a chamber containing an electric field responsive light gating liquid. Means are provided for establishing a pattern of electrical charges corresponding to the information to be displayed. Light gating particles in the liquid respond to the fields of the electrical charge pattern by moving toward alignment with the electric field lines or by otherwise altering their transmission or reflectance of light and by so doing form a visual image.

66 Claims, 9 Drawing Figures

INVENTOR
CARLYLE W. JACOB

LIGHT GATING DISPLAY

This application is a continuation-in-part of my earlier application Ser. No. 168,048 which was filed on Aug. 3, 1971. That earlier application, is a continuation-in-part of my preceding application Ser. No. 724,661 which was filed on Mar. 18, 1968. That preceding application, in turn, is a continuation-in-part of my parent application Ser. No. 383,471 which was filed on July 17, 1964. The parent application, application Ser. No. 724,661, and application Ser. No. 168,048 are now abandoned.

This invention relates in general to the establishment of a visual display by controlling the transmission of light in a light gating liquid with a pattern of electric charges. The active light gating agent in the light gating liquid consists in general of light gating particles that alter their positions when acted upon by an electric field. In the invention the light gating liquid is disposed in a thin chamber in a manner permitting the active particles therein to alter their positions and change their light transmission or reflectance when acted upon by an electric field pattern extending into the chamber.

The invention resides in a display system employing a panel having apparatus for establishing an electric field pattern corresponding to the information to be displayed. In one embodiment of the invention a light image is projected onto the rear of the panel. Through the action of a photoelectric surface adjacent the rear face of the panel, the projected light image is transformed into an electrical charge image that is made to control the light gating particles that are in a fluid chamber in the panel. In another embodiment of the invention, the electrical image is formed by applying suitable electrical potentials to electrically conductive plates attached to the rear of the panel. The light gating particles are small electrically responsive elements that are adapted to rotate in an electrical field. Other types of mobile light gating particles may also be employed. The light gating elements selectively alter the reflectance of the front side of the panel so that an observer, by reflected light, sees a bright display on the front side of the panel corresponding to the pattern of electrical charges.

UTILITY OF THE INVENTION

The present invention has many applications. One of the uses of the embodiment employing the photoelectric surface is as an image intensifier for cathode ray tube displays. The conventional cathode ray tube, by itself, is too limited in size and brightness to satisfy the requirements for a simple, large area display that may be viewed either outdoors or in a fully lighted room. Another use is in the field of microfilm enlargement and viewing. The projected light image on the ground glass screen of most microfilm viewers is rather weak. These viewers are unsatisfactory for observing microfilm containing information in greatly reduced size. The use of a display panel, in place of the ground glass screen, to intensify the microfilm image projected upon the panels photoelectric surface opens up a vast field in high density information storage on microfilm.

Other applications of the invention are in the field of advertising and in large display systems in which the information to be displayed is supplied electrically by suitable connecting wires to the plates on the rear of the display panel. By compartmenting the fluid chamber, very large display panels can be constructed and the information in the separate compartments can be individually erased.

OBJECTIVES OF THE INVENTION

The primary object of the invention is to provide simple display apparatus employing small light gating elements that respond to an electric charge pattern, representing information to be displayed, by forming a visual image corresponding to the charge pattern.

A further object of this invention is to provide simple display apparatus capable of responding to an image of low intensity projected upon the rear face of a panel by establishing a bright visual display of the image on the front face of the panel.

A further object of the invention is to provide a display panel having improved light gating means, including light gating particles, for selectively gating light striking the front side of the panel in accordance with a light image projected onto the rear side of the panel.

A further object is to provide display apparatus in which a positive reproduction of an original light image can be made and also display apparatus in which a negative reproduction of an original light image can be made.

A further object is to provide a display panel with the ability to retain information (viz., with a "memory") so that the observed reproduction will be visible after the original projected light image has been shut off.

A further object is to provide means in the aforementioned display panel for erasing the display including means for varying the speed of erasure.

A further object of this invention is the provision of simple apparatus using a light gating liquid substance within a chamber to form a visual image which apparatus permits the light gating substance to be employed in a manner causing the image to have unusually high contrast.

Other objects and many of the attendant advantages of the invention will be readily appreciated as the invention becomes better understood by reference to the following detailed description when considered in connection with the accompanying drawings, wherein:

THE DRAWINGS

Figure 6:
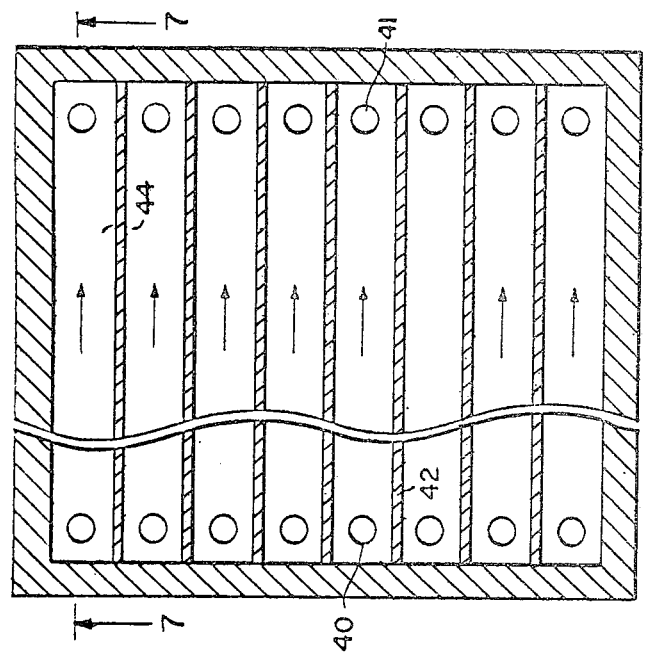
Figure 7:
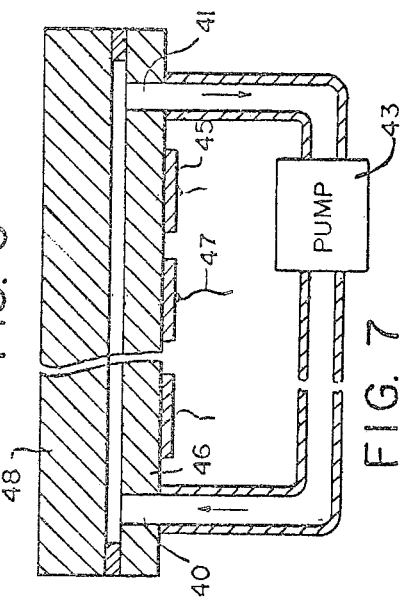
Figure 4:
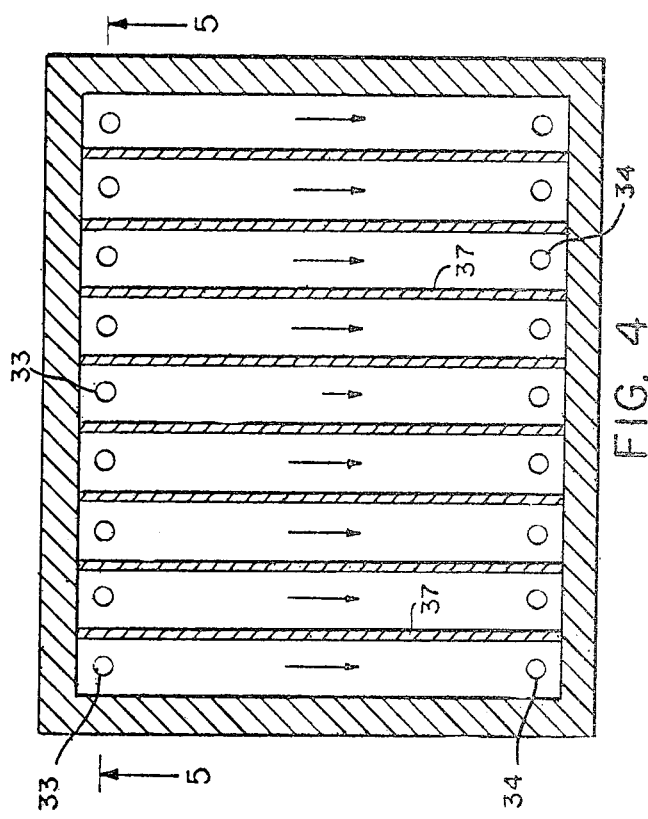
Figure 5:
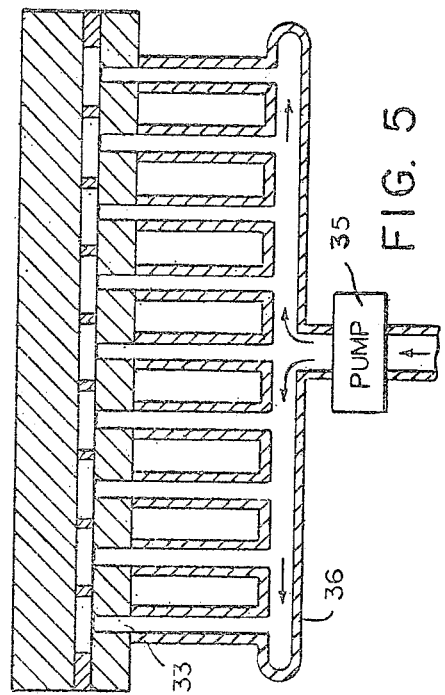
Figure 8:
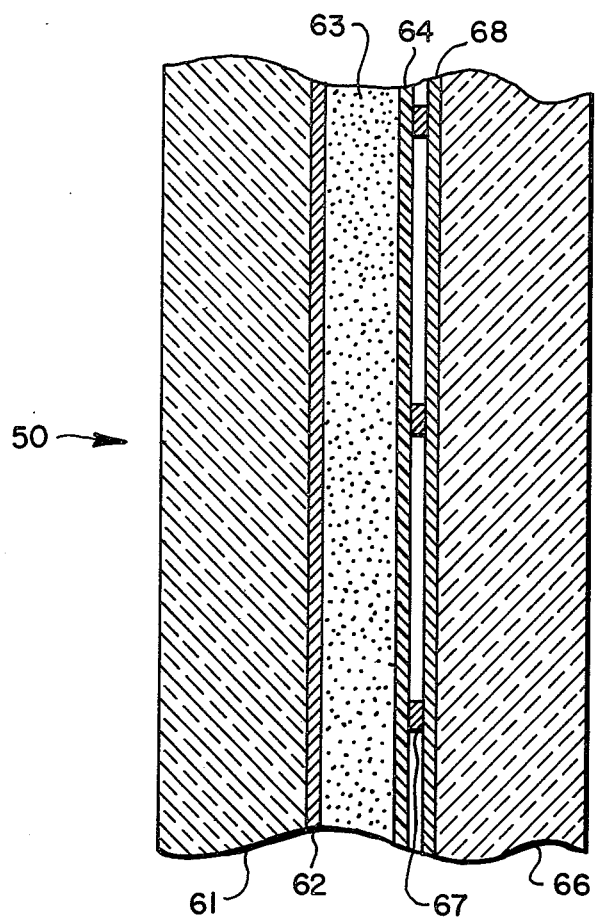
Figure 9:
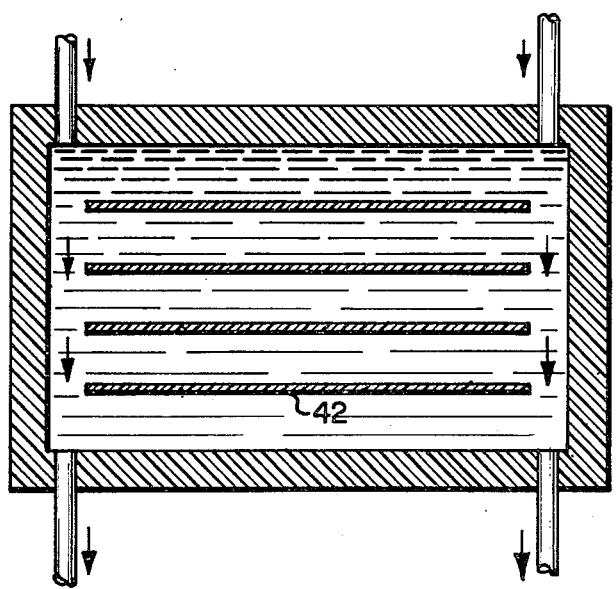

FIG. 4 is a sectional view illustrating the vertical arrangement of guide vanes in the fluid chamber, FIG. 5 is a sectional view taken along the parting plane 5—5 in FIG. 4 and shows the inlets to the compartmented fluid chamber, FIG. 6 is a sectional view showing the compartmenting of the fluid chamber into horizontal zones, FIG. 7 is a sectional view taken along the parting plane 7—7 in FIG. 6, FIG. 8 is a sectional view depicting an embodiment of the display panel employing a conductive grid in front of the photoconductive layer, and FIG. 9 is a sectional view showing a chamber having open ended compartments.

THE EXPOSITION

Figure 1:
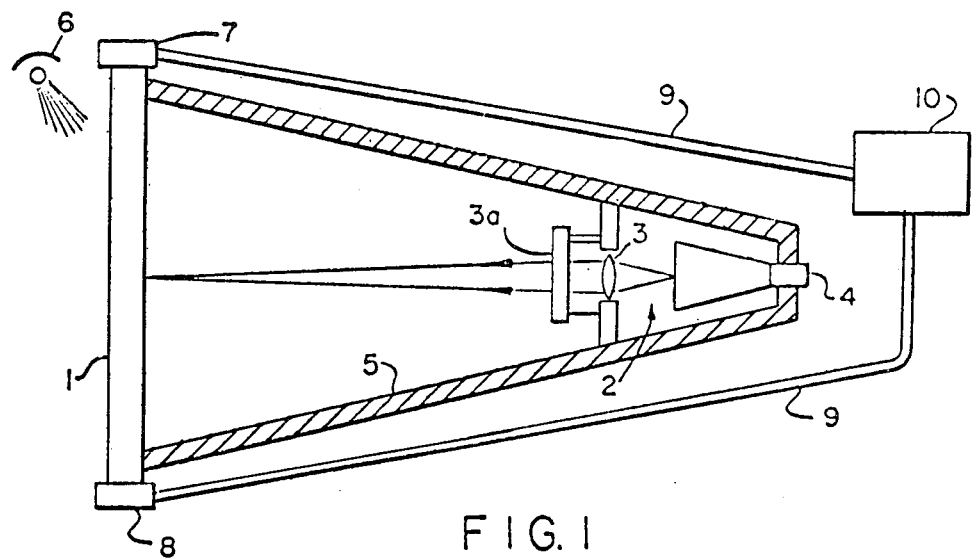
FIG. 1 illustrates a general arrangement of the invention employing a display panel and projection apparatus.

Referring now to FIG. 1 there is depicted a display panel 1 with apparatus 2 for projecting a light image onto the rear side of the display panel 1. The projection apparatus 2, may, for example, comprise a lens 3 with a suitable shutter 3a and a cathode ray tube 4 suitably energized to produce a luminescent image on its face. Alternatively, the projection apparatus may be a microfilm projector or any other type of apparatus capable of projecting a luminous image onto a display screen. A suitable light tight housing 5 encloses the lens 3 with its shutter 3a and the cathode ray tube 4. The shutter 3a is normally maintained in its open position. The front surface of display panel 1 may be illuminated by a light source 6 to aid an observer in viewing the front or display side of the panel 1. At the top of panel 1 is mounted an upper reservoir 7 and at the bottom a lower reservoir 8. The reservoirs hold a light gating liquid and are connected by suitable conduits 9 and 26 to a variable speed pump 10. By means of this pump 10 the liquid is circulated through the display panel 1.

Figure 2:
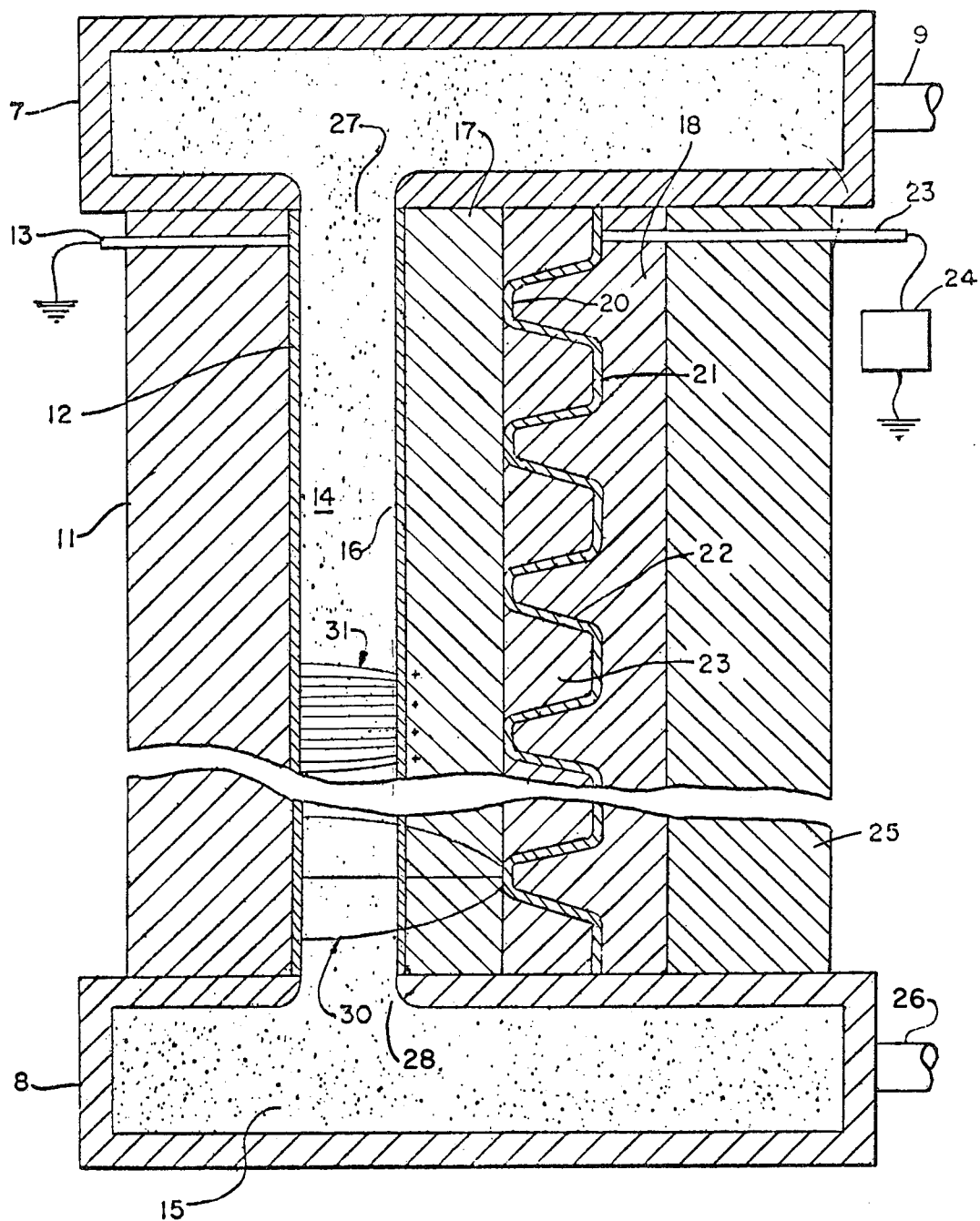
FIG. 2 is a cross-sectional view of one embodiment of the display panel.

FIG. 2 illustrates an enlarged section of an embodiment of the display panel 1. It comprises a front glass plate 11 having a transparent electrically conductive coating 12 on its inner surface. This transparent coating 12 is, for example, a thin film of tin oxide, sometimes called a Nesa coating. The coating is preferably grounded by a conductive rod 13 and constitutes the front wall of a thin suspension or fluid chamber 14. A thin opaque coating or sheet 16 such as a black or deeply colored mylar sheet about 0.001 inch in thickness constitutes the rear wall of suspension chamber 14. The opaque sheet 16 is spaced approximately 0.003 to 0.005 inches from the Nesa coating 12. Other spacings may be used depending upon the degree of resolution desired in the displayed image. The thickness of the fluid chamber is one of the parameters that determine the resolution of the displayed image. Tiny spacers may be positioned at suitable intervals in the fluid chamber to maintain the desired inside dimensions of the chamber.

The fluid chamber is filled with a light gating substance such as is formed by an oil suspension 15 of fine needles or flakes like aluminum or graphite flakes. Plastic needles or flakes with a high dielectric constant may also be employed but electrically conductive needles or flakes are preferred. At the top and bottom of the fluid chamber are long narrow reservoirs 7 and 8 which run the length of the panel. Conduits 9 and 26 connect these reservoirs to the pump 10 shown in FIG. 1. These reservoirs connect with the fluid chamber through ports 27 and 28 respectively. The lower reservoir 8 may be made the entrance reservoir and the upper reservoir 7 the exit reservoir although the suspension can be made to flow in the reverse direction. Adjacent the opaque sheet 16 is a photoconductive layer 17 that is activated by rays of light from projection apparatus 2. The photoconductive layer 17 may be composed of a substance such as selenium, cadmium sulphide, zinc oxide or any of the other well known photoconductive materials. Zinc oxide and cadmium sulphide photoconductors and the like have been widely used in granulated form with the individual grains bound together by a resin.

To the rear of photoconductive layer 17 is a sheet of transparent plastic or glass 18 having its front surface photographically etched or otherwise milled or molded to form a matrix of peaks and valleys. The peaks and valleys may be long parallel ridges and grooves alternating with one another but preferably the peaks are isolated raised points with each point surrounded on all sides by a valley like the raised halftone dots on a letter press plate. The peaks are designated by numeral 20 and the valleys by numeral 21. This front undulated surface of sheet 18 is made electrically conductive by a thin deposit 22 of a transparent, electrically conductive material, such as a very thin evaporated metallic film or a Nesa coating. The peaks 20, thus, are conductive peaks and the valleys 21 are conductive valleys. The conductive peaks 20 of sheet 18, preferably, make physical and electrical contact with photoconductive layer 17. The spaces between the conductive peaks 20 may be air spaces but preferably these spaces are filled with a transparent, insulative plastic material 23 to aid in maintaining the strength of the panel. A transparent plate of glass or plastic 25 is bonded to the rear side of sheet 18 to increase the structural rigidity of the display panel. The electrically conductive layer 22 is connected by a suitable rod 23 to a source of electrical potential 24.

In the operation of a display system employing the panel of FIG. 2, an A.C. voltage of about 100 volts with a frequency of about 100 cycles/second is supplied to the conductive coating 22 from the potential source 24. The magnitude of both the voltage and frequency can be varied considerably depending upon the dimensions of the various components of the panel, the properties of the photoconductor used, etc. The voltage on the conductive coating 22 causes electric lines of force to be established between the conductive peaks 20 and the grounded conductive layer 12. When the photoconductor 17 is unilluminated and thus in its dark condition it will behave as an insulator and most of the electric drop in potential between the two conductive Nesa layers 12 and 22 will be in the vicinity of the peaks 20 because here the electric field lines are most concentrated. The electric field in fluid chamber 14 will be rather mild and will only mildly influence the suspended particles in the chamber. When the photoconductor is illuminated by rays of light from the projection apparatus 2, however, the photoconductor becomes conductive in the illuminated areas and electric charges flow in a spreading manner from the conductive points 20 to the surface of the opaque coating 16. Thus although the charges originate in a sharp point or ridge, they spread out to cover a much larger area on the opaque coating 16. The spread out charge on the rear wall of the fluid chamber has a much larger influence on the suspended particles within the chamber than the pinpoints of charge on the conductive peaks 20. In the illuminated areas of the panel the drop in potential between conductive peaks 20 and the surface of the opaque coating 16 is almost zero or very low and almost the entire drop in potential between conductive layer 22 and grounded layer 12 occurs within the fluid chamber.

The light pattern projected onto the rear side of the display panel 1 produces an electric field pattern within the fluid chamber that relates to the light pattern. Where the electric fields are weak the gating action is weak. The portions of the display panel where the electric fields and gating actions are strong are herein referred to as image areas and the remaining areas where the electric fields and gating actions are weak or even substanially zero as non-image areas.

Depicted in FIG. 2 are electric field lines 30 representing field lines in a non-image area of the panel and electric field lines 31 representing electric field lines in an image portion of the panel. The field lines 31 extend between the grounded Nesa layer 12 and electric charges, shown as + charges on the opaque sheet 16. In an image area of photoconductive layer 17, electric charges flow to the opaque sheet 16. These electric charges alternate between + and − charges when the voltage supplied to the Nesa coating 22 by the voltage supply 24 alternates between a plus and minus polarity. The voltage supply 24 may supply a sinusoidal A.C. voltage or a square wave or other suitable pulsed A.C. voltage. The voltage used might even be a pulsed D.C. voltage. The difference in strengths of the electric fields in the image and the nonimage areas of the fluid chamber depend primarily upon two parameters and can be accentuated by a suitable choice of those parameters. The first is the thickness of the photoconductive layer 17 in relation to the thickness of suspension chamber 14, and the second is the area of conductive peaks 20 in relation to the area of the valleys between the peaks. The sharper the conductive peaks 20 and the farther away they are positioned from the opaque sheet 16, the weaker is the resultant electric fields in the non-image areas of the fluid chamber. If peaks 20 are long narrow ridges instead of points then the ridges should be thin and narrow in relation to the valleys between them.

As an alternate construction a simple flat conductive grid such as a metallic grid may be substituted for the undulating conductive surface 22. This grid may be an array of very fine parallel wires all running in one direction or the grid may be formed by crossed conductors as in a conventional screen. Instead of using wires the grid may be evaporated by conventional evaporating techniques onto a glass plate. This glass plate with its metallic grid thereon can then be substituted for the glass sheet 18 with its conductive coating 22. The photoconductive material coated thereon may be, by way of example, cadmium sulphide. This may be in sintered form or it may be small crystals imbedded in an epoxy or other plastic binder. If the sintered form is used then the grid should preferably be electroplated with gold to avoid contaminating the photoconductor during the sintering process with foreign metallic atoms. Most photoconductors are only slightly transparent to visible light. The transparency of a photoconductive layer can be considerably increased by mixing or otherwise interspersing ground glass or small glass beads or other transparent objects in with the photoconductor thus permitting light to penetrate more deeply into the layer. Of course, if the display panel is intended to be used with projected X-ray images then the photoconductive layer even if quite thick will need no interspersed glass particles. If the display panel is used with visual projected images and the photoconductive layer is not interspersed with glass particles and in addition is very thin, then in the image areas the electric charges will spread laterally from the grid wires or conductive peaks and a useful display will still be formed. One advantage in having the photoconductive surface in the form of a very thin essentially flat layer of photoconductor that is adapted to spread the electric charge laterally instead of both laterally and in a forward direction is that the photoconductive surface in this form has a maximum sensitivity to the projected light rays. The light rays are not required to penetrate very far into the interior of the photoconductor and also they strike the photoconductive surface in full strength substantially normal to the surface thus utilizing the projected rays in the most efficient manner.

If both the photoconductive layer and the evaporated grid are very thin then it may not be too material on which side of the photoconductive layer the grid is located. FIG. 8 shows a section of a display panel 50 in which the grid is located on the front side of the photoconductive layer. The various members of this display panel 50 are, in sequence from front to rear, as follows:
front glass plate 61,
conductive Nesa layer 62,
fluid chamber 63,
opaque protective plastic sheet 64,
grid 67,
photoconductive layer 68, and
rear glass plate 66.

The grid may be fabricated by evaporating in a vacuum a thin layer of copper onto a mylar sheet. The mylar sheet may by way of example be about 0.002 inch thick and the copper layer about 0.0001 inch thick. The copper is then photographically etched to form a grid with the elements of the grid about 0.001 inch wide. The mylar sheet then becomes the opaque protective sheet 64 and the grid thereon grid 67. The photoconductive layer 68 may be formed by evaporating a very thin coating of cadmium sulphide onto the front side of the rear glass plate 66. Preferably the front surface of the glass plate 66 is first sand blasted with a fine grit to improve the adherence of the cadmium sulphide to the glass. Although this sand blasting will cause undulations to appear in the photoconductive layer 68 the electric charge in the image areas of this photoconductive layer will still be considered to move essentially in a lateral direction. The mylar sheet 64 with the grid 67 thereon may then be cemented to the photoconductive layer 68 with an extremely thin film of cement although even this cementing is not essential since the pressure within the fluid chamber will cause the mylar sheet and grid to make good contact with the photoconductive layer. In addition suitable vacuum means may be employed to maintain a mild vacuum between the mylar sheet and the photoconductive layer.

Although as previously mentioned the grid may be positioned directly on the rear glass plate 66 and the photoconductive layer then evaporated over both the rear glass plate and the grid so that the grid is on the rear side of the photoconductive layer there are some advantages in having the grid and photoconductive layer positioned as in FIG. 8. One reason is the ease of manufacture and the other is that the component of the electric field lines emanating from the grid that pass through the photoconductive layer tend to be less strong when the grid is on the front side of the photoconductive layer instead of on the rear side. At the point where the grid contacts the photoconductive layer it is desirable to have the electric field lines at reduced intensity so as to minimize dark currents. In addition, by having the photoconductive layer deposited on a sandblasted glass surface so that the photoconductive layer is undulating, the dark current within the photoconductive layer is further minimized since the undulations increase the path lengths in which the dark current must flow in their generally lateral direction. The signal currents in the image areas of the photoconductor are not adversely affected since the electric potential of the grid is usually quite adequate to cause ample electric currents to readily flow in the image areas of the photoconductor.

It should be pointed out that the display panel can still be made to function if the conductive surface 22 is completely flat, i.e., without any grids, points, ridges or other undulations provided that the photoconductive layer 17 is made sufficiently thick. The electric charges in the image areas will then move in a direction that is essentially normal to the face of the panel. Thus the display panel can be designed to operate in a manner in which the electric charges in the photoconductor move in a direction which is either parallel or perpendicular to the face of the panel or in a direction which is a combination of these two directions.

The suspension 15 in fluid chamber 14 is preferably composed of small needles or flakes, like fine aluminum needles or flakes, suspended in a oil or other suitable fluid. The oil or other vehicle may be thin like kerosene or it can be quite viscous like a heavy motor oil. In some applications flakes are preferred for the suspended particles, in other applications needles are more desirable. In general, flakes are more desirable in those systems that are designed for light reflective particles, while needles usually are best in those systems requiring light absorbing particles. Needles also tend to be better for high resolution systems because very minute elongated particles are needed in those systems and needles can be made very minute. In the ensuing descriptions the term "flakes" is often used as a shorthand designation for flakes, needles or other elongated particles. It should be understood that any display system that operates with flakes will also operate with needles. Through the action of pump 10, the suspension is forced slowly upward from reservoir 8, through fluid chamber 14, and into reservoir 7. The upward flow of the suspension develops a viscous frictional force between the oil molecules of the suspension and the walls of the fluid chamber and also an intermolecular frictional force between neighboring oil molecules. These frictional forces cause the suspension to flow in a laminarlike flow with the laminae next to the front and rear walls of the fluid chamber moving at a very low velocity and the laminae nearer midstream moving at a higher velocity. The velocity gradient between the laminae adjacent the walls of the fluid chamber and the laminae in midstream exerts a turning moment on the needles or flakes that causes them to rotate until they are in a generally vertical position with their faces parallel to the walls of the fluid chamber. Elongated particles in a motionless suspension tend to be randomly oriented or partially horizontally oriented depending on the particle size. Since the velocity gradient across the fluid chamber is greater near the walls of the fluid chamber it is here that the vertical orienting forces on the flakes are greatest. In viewing the display panel by reflected light, it is mostly the elongated particles adjacent the front wall of the fluid chamber that one sees and where these particles, say aluminum flakes, are all parallel to the front wall they strongly reflect the light incident upon the front face of the display panel so that the panel appears very bright to an observer. It has been found that for this laminar-like flow to occur and for the flakes to orient themselves in the most optimum reflective position these three conditions are important: one, the fluid chamber should be quite thin; two, the suspension fluid should not be excessively thin but should have at least some body or viscosity; and three, the flow velocity of the suspension up the fluid chamber should be quite slow so as to avoid turbulence and other undesirable effects. However, the flow velocity must still be sufficient to produce a definite vertical aligning force on the suspended flakes.

When a reasonably strong electric field, either A.C. or D.C., is established across the fluid chamber, a turning moment is exerted on the flakes within this electric field which causes the flakes to rotate until they are all substantially parallel to the electric field. For example, the electric field lines 31, shown in fluid chamber 14 cause the flakes encountering the field lines to rotate until they are aligned with the electric field and, hence, the flakes within the field become substantially perpendicular to the face of the display panel. The flakes closely adjacent the Nesa coating 12 tend to be truly perpendicular to the display panel face for here the electric field lines are absolutely perpendicular to Nesa coating 12. The orientation of the front layer of flakes in the fluid chamber is quite important for it is the front layer of flakes that chiefly governs the reflection or absorption of the ambient light by which the panel is viewed. When light rays incident on the panel strike an area of the panel where the suspended flakes are perpendicularly oriented, the light rays pass deeply into the suspension and, for a highly concentrated suspension, are completely absorbed internally by the suspension. This produces an unusually black spot. If the suspension contains only a mild concentration of flakes, light rays passing through the suspension will strike the opaque sheet 16 and be absorbed by it if the sheet 16 is black. If the sheet 16 is not black, then the light rays striking the sheet 16 will be at least partially reflected back to the observer. If the sheet 16 is colored, say red, then the observer will see a red reflection.

When the flakes are vertically oriented so that their faces are parallel to the face of the display panel, the flakes are very effective not only in reflecting the incident light but also in blocking the transmission of light through the fluid chamber. In some applications it is desirable to employ the light gating action of the flakes to control the transmission of light to and from the rear wall of the fluid chamber, particularly if the rear wall is colored or otherwise bright. For these applications black graphite flakes or small light absorbing needles may be substituted for the aluminum flakes in the suspension. The vertically oriented elongated particles will then determine the dark areas of the panel and the horizontally oriented particles the bright areas.

A needle shaped light gating particle is considered to be parallel to the face of the display panel when its longitudinal axis is parallel to the face of the panel. A flake shaped light gating particle is considered to be parallel to the face of the display panel when its flat surface is parallel to the face of the panel.

Very small thin particles in a stationary suspension tend to be randomly oriented or if the thin particles are somewhat larger they will tend to be partly randomly and partly horizontally oriented because larger thin particles tend to settle downward due to gravity in partially horizontal orientations. If a suspension of thin particles is made to flow between the walls of a thin fluid chamber the fluid shear forces in the flowing suspension will exert a force on the particles tending to turn them in a direction that is parallel to the walls of the fluid chamber. However, because of other interfering forces such as Brownian motion forces, the particles never reach this idealized parallel configuration. In the same way, the thin particles when acted on by strong electric fields never completely align themselves with the electric field lines, i.e., in the image areas of a display panel, the particles never completely orient themselves in a direction that is perpendicular to the face of the panel. However, the parallel orienting forces acting on the thin particles in the flowing suspension do cause the particles to be definitely more oriented toward the parallel than they would be if a smooth, laminar-like flow were never imparted to the suspension. In the same way, strong electric field lines in the image areas of the display do cause the elongated particles to be much more perpendicularly oriented to the face of the panel then they would be if there were no strong electric fields. Thus high contrast, high quality displays can be produced even though the idealized state of completely parallel and completely perpendicular orientations of the particles is never realized. What is important is that the difference in the orientations of the elongated particles in the image and non-image areas be high, or, stated somewhat differently, it is important that light striking the panel be strongly intercepted by the elongated particles in the non-image areas but not strongly intercepted by the elongated particles in the image areas. Then good displays will be achievable both in these cases where the display system is designed to be viewed by reflected light and in those cases where the system is designed to be viewed by transmitted light.

The suspension of light gating particles should flow through the fluid chamber as a thin broad smooth laminar ribbon-like stream. Inasmuch as there can be some uncertainty as to the meaning of the word "laminar" as used in this specification, the intended meaning of that term is here clarified. Laminar or streamline flow is defined in Websters International Dictionary as an uninterrupted flow of a fluid past a solid body in which the direction at every point remains unchanged with the passage of time. In classical hydrodynamics the flow of a homogenous fluid through a duct tends to be laminar if the velocity of the flow is low, but if the flow velocity is increased beyond the so-called "critical value" the smooth flow breaks down into a turbulent flow containing very large numbers of rapidly and irregularly flowing masses of fluid that move in a random pattern producing thereby a rapid churning and mixing action in the fluid often involving eddies. In textbooks on hydrodynamics, laminar and turbulent flow are discussed in detail but these discussions are almost always limited to pure homogenous fluids containing no solid particles and thus these discussions are not applicable to fluids having solid particles and are particularly inapplicable to fluids having high concentrations of solid particles that are larger in size then fine colloidal particles.

In the present invention, suspensions are employed which often contain light gating particles that are larger than microscopic in size. Thus even in the case of a suspension flowing very slowly down a fluid chamber the fluid constituent of the suspension will, to some extent, flow around each light gating particle and cause the flow of the suspension to deviate from a strictly straight line flow. Furthermore since each light gating particle is in motion relative to the suspending fluid, the flow lines around each particle must change with time. This distortion of the flow lines may be very slight if the light gating particles are very minute and are not present in high concentrations, but as the size and concentration of the particles increases the deviation of the suspension flow from strictly straight line flow unchanging with time will increase. Thus, even where the suspension flow is very slow and exhibits none of the eddying and violent mixing action generally associated with turbulent flow, the slow flow of the suspension in the fluid chamber because of the presence of the light gating particles cannot be strictly classed as "laminar" flow according to the Webster Dictionary definition of that term. However in spite of this deviation from the strict Webster definition of laminar flow the fluid flow in the vertical display panel shown in FIG. 1, for example, has enough of a straight line vertical component to produce a strong vertical aligning force on large numbers of the light gating particles so that many of these particles will orient themselves sufficiently toward the vertical to permit a very useful and desirable display to be produced — far more acceptable than if there were a random mixing of the light gating particles.

An analogy to indicate the complexity in defining laminar flow might be the case of a slow, quiet, smoothly flowing river in summertime. The flow would generally be considered to be laminar or streamline flow. However if this slowly moving river is filled with many floating tree leaves then the flow cannot be strictly classified as laminar flow — at least not according to Webster's definition — because the flow lines in the vicinity of each leaf will be constantly changing in magnitude and direction, particularly if the leaves are slowly rotation or otherwise changing their orientations with respect to the river. However even though the slow quiet flow of this leaf-filled river might not come under the strict definition of laminar flow the flow is certainly vastly different from that which prevails during spring flood periods when the river may be a raging torrent. Then there is no doubt that the flow is turbulent.

Thus since the term "laminar flow" can be construed to have such a very narrow meaning that it can be arguable if it has any meaning at all when applied to the flow of suspensions it has been deemed appropriate in the claims to use the term "smooth" or "smoothly flowing" instead of laminar to describe a suspension flowing slowly, quietly and smoothly between the walls of a thin fluid chamber. This slow smooth flow would be classified as laminar if there were no suspended particles in the flowing fluid stream. Likewise in the present patent application the terms laminar flow, "laminar stream", and "laminar-like flow or stream" when applied to a flowing suspension of light gating particles is intended to mean that the suspension is flowing slowly and smoothly enough so that the flow would be a classical laminar flow if the suspension consisted only of a pure fluid unencumbered by light gating particles. In the present invention the suspension of light gating particles should of course be introduced into the suspension chamber as smoothly as possible to avoid agitation of the stream.

An alternate procedure for producing a pattern of electric fields in fluid chamber 14 corresponding to the pattern of lights and shadows projected onto the rear face of the panel is to intermittently pulse or shutter the light from the projection apparatus 2. This may be accomplished by pulsing the light source in the projection apparatus 2 or by employing a rapidly revolving disk type shutter or other rapid action shutter 3a adjacent the lens 3. With the alternate procedure, voltage supply 24, which is connected to the conductive coating 22, is arranged to produce voltage pulses in synchronism with the projected light image pulses. When a light image pulse strikes photoconductive layer 17 and renders it selectively conductive, the voltage pulse drives charge through the conductive areas of the photoconductor to the surface of the opaque sheet 16, where the charge tends to remain trapped when the light image is shut off and the photoconductor 17 returns to its non-conductive state. As the voltage pulse also drops to zero, the only electric fields existing in the fluid chamber are those created by the trapped charges on the opaque sheet. These trapped charges will normally slowly leak back to the conductive coating 22 so that the light image and voltage pulsing must be repeated at intervals. The pulse length should be relatively short compared to the periods between pulses. With this procedure the average value of the electric fields in the fluid chamber will be strong in the image areas and weak in the non-image areas. Thus the flakes in the fluid chamber will be gated strongly in the image areas and weakly in the non-image areas.

Figure 3:
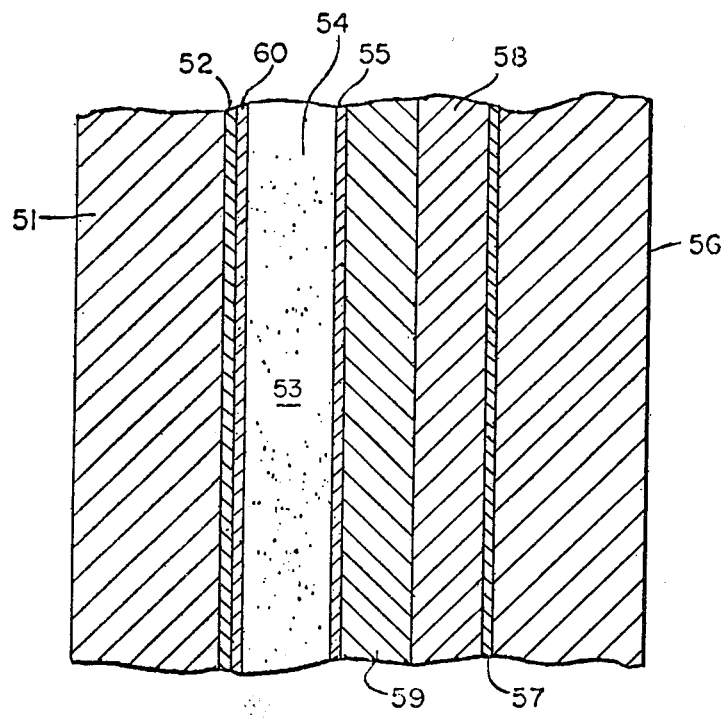
FIG. 3 is a cross-section view of another embodiment of the display panel.

FIG. 3 illustrates an enlarged section of another embodiment of the display panel 1. It shows an alternate means for establishing in the fluid chamber of the display panel 1 a pattern of electric fields that corresponds to the projected pattern on the rear side of the panel. The panel comprises a front glass plate 51 to which is bonded a transparent, electrically conductive coating 52 and a rear glass plate 56 to which is bonded a transparent, electrically conductive coating 57. Coatings 52 and 57 are preferably Nesa coatings but they may be evaporated metallic coatings, thin enough to transmit light. They might even be very fine evaporated metallic screens. Rear conductive coating 57 may also consist of closely spaced, electrically conductive peaks as in the embodiment of FIG. 2. Conductive coating 52 is preferably covered with a thin, transparent, electrically insulative film 60 of a material such as a plastic or glass. A thin opaque plastic coating or sheet 55 forms the rear wall of fluid chamber 53. The suspension 54 in fluid chamber 53 may consist of aluminum needles or flakes in an oil as in the embodiment of FIG. 2. A suitable photoconductive layer 58 is adjacent the conductive coating 57 and a "non-linear", semiconductive layer 59 is disposed between the photoconductive layer 58 and the opaque plastic sheet 55. The characteristics of the semiconductor employed in layer 59 are such that it responds in a non-linear manner to applied voltages. Its electrical conductivity should increase with increases in the applied voltage across the semiconductor. Then the semiconductor layer 59 will tend to be conductive when the potential across it is relatively strong and non-conductive when the potential across it is weak. Many of the well known semiconductors, such as selenium, or cadmium sulphide crystals embedded in a plastic binder, possess this non-linear property. Suitable electrode or junction materials in contact with the semiconductive layer may aid in imparting to this layer a non-linear characteristic. For this purpose a thin film of metal that may be oxidized or otherwise treated may be deposited on the front surface of the semiconductive layer 59 adjacent the opaque sheet 53. To reduce the transverse electrical conductivity of this film the metal in the film may be segmented into tiny granules or spots to form a mosaic of metallic spots with adjacent spots insulated from one another. The potential supplied to conductive layer 57 is preferably in the form of direct current pulses. By way of example, a pulse rate of several hundred pulses per second and a pulse width of several hundred microseconds may be used. The optimum pulse rate and width depends on the particular semiconductive and photoconductive layers used and on the speed requirements of the display panel. Because of the non-linear characteristics of the semiconductive layer 59 a reasonably strong voltage pulse applied to conductive coating 57 drives electric charge through the illuminated portions of the photoconductive layer 58 to the rear surface of the opaque sheet 55, where the charge tends to remain after termination of the voltage pulse. Some of the non-linear semiconductors like solid state diodes and rectifiers have the additional valuable property of being much more conductive in one direction than in the other. Examples of solid state rectifiers that may be used are silicon, selenium and germanium rectifiers. If a rectifier is used for the non-linear semiconductive layer 59 it may be a broad, flat, continuous rectifier covering the entire face of the fluid chamber 53 or it may be segmented into many small disks to form a mosaic of small disk shaped rectifiers. When a rectifier is used it should be preferably mounted in a manner so as to easily conduct an electric charge from the image portions of the photoconductive layer 58 to the rear surface of the opaque sheet 55. In the reverse direction of current flow, the resistance of the rectifier is much higher so that in the image portions of the panel, electric charges from the pulsed conductive layer 57 are trapped adjacent the opaque sheet 55. The electric field from the trapped charges acts on the flakes in the fluid chamber that are opposite the trapped charges, causing those flakes to rotate to a horizontal position. The trapped charges slowly leak back through the rectifier in its so-called non-conductive direction and from there to the conductive coating 57 so that by the time the next pulse appears the electric charges adjacent the opaque sheet 55 have substantially disappeared. Thus even though the pulses are short they produce a relatively long charge memory on the rear wall of the image portions of the fluid chamber. In the non-image areas the photoconductive layer 58 is non-conductive so that no charge memory is established. The voltage pulses applied to the conductive coating 57 are by themselves too short in duration to effectively gate the particles in the non-image areas of the fluid chamber. Gating can only occur when the effective duration of a voltage pulse is lengthened by a charge memory.

In the semiconductor art the various materials employed for photoconductors, rectifiers and other semiconductors with non-linear voltage current characteristics are usually quite similar and often identical. Thus, selenium is widely used as a photoconductor, it has very definite non-linear voltage-current characteristics and when bounded by the proper junction layers it makes a very efficient rectifier. Thus the two layers 59 and 58 can be combined into a single layer, such as a single layer of selenium or cadmium sulphide crystals embedded in a plastic, which will be substantially as effective as the double layer. For a simplified terminology, as used herein, the term "non-linear photoconductive layer" or "photoconductive layer with non-linear voltage current characteristics" includes the compound layer as well as the single layer between the transparent conductive surface 57 and the rear wall of the fluid chamber. This rear wall is normally the opaque sheet or coating 55. This non-linear photoconductive layer may be a single photoconductive layer or it may be a compound layer that includes cooperating layers such as semiconductive layer 59 in FIG. 3 and junction or contact layers when used. The term "non-linear" when used to describe a layer means that the conductivity across the layer increases or otherwise changes with increases in the applied voltage across the layer — this includes rectifying layers where the conductivity of the layer changes markedly with changes in the polarity of the voltage across the layer.

With the various methods so far discussed for establishing in the fluid chamber of the display panel a pattern of electric fields that corresponds to the projected light intensities in the image and non-image areas of the panel, it is difficult to obtain a substantially field free region in the non-image areas of the fluid chamber. Even a mild electric field in the fluid chamber will exert some gating action on the suspended flakes, and although this gating action may be small it is still undesirable. If the suspension of the flakes is stationary without any upward translatory motion, then flakes in the non-image areas which are acted on by weak electric fields in these non-image areas will very slowly rotate until eventually the flakes are all perpendicular to the face of the panel. Even with a very mild electric field there will be at least some undesirable rotation of the flakes. The influence on the flakes of the weak electric fields in the non-image areas can be compensated for by giving the suspension a slight translatory motion. This may have any direction parallel to the face of the panel, such as, for example, an upwards direction. Then the shearing action of the laminae within the broad flowing ribbon-like stream exerts a vertical orienting force on the suspended flakes that is greater than the horizontal electric field orienting force in the non-image areas so that the flakes in these areas are maintained in a generally vertical position. In the image areas the horizontal electric field orienting force is great enough to overcome the vertical fluid orienting force and the flakes rotate to a horizontal position. The translatory velocity of the suspension is thus quite important. This translatory velocity should be of such a magnitude that the average value of the vertical orienting force is greater than the average value of the horizontal orienting force on the flakes in the non-image areas but less than the horizontal orienting force on the flakes in the image areas. Or, stated slightly differently, the translatory velocity of the suspension should be enough to destroy the horizontal fog orientation of the flakes in the non-image areas but not enough to destroy the horizontal signal orientation of the flakes in the image areas. Thus if the suspension contains reflective flakes like aluminum flakes the non-image areas of the panel will appear very bright and the image areas very dark. The term "fog" is herein used in the photographic sense to denote the unwanted darkening or other alteration that occurs in a light sensitive emulsion that has not been exposed to light. In the panel embodiments of FIGS. 2 and 3 a slight fogging or darkening normally occurs in the non-image areas of the panel unless the suspension is given at least a mild translatory velocity. In addition to these undesirable rotations, it sometimes happens that in the image areas where the electric fields are strong, some of the flakes migrate to one or both of the walls of the fluid chamber and deposit on these walls. A slow translatory motion of the suspension can prevent this unwanted deposition. Thus the translatory motion of the suspension should be sufficient to prevent undesirable depositions of the flakes in the image areas and also sufficient to prevent undesirable rotations of the flakes in the non-image areas. Although the translatory velocity of the suspension should preferably be slow and constant it may also be intermittent and variable. For example, the velocity may be rather high while the entire panel is being erased, then it may actually be zero while a display is being formed. However, if one wishes this display to remain at a maximum brightness for any length of time, some translatory velocity is needed to overcome the undesirable effects discussed above. Also if the equipment has been idle for any length of time, even a short time, the suspension should first be given a translatory motion to impart a vertical orientation to the flakes before the new display is formed.

A highly desirable feature of the invention is the inherent persistence of vision or memory incorporated in the panel. This memory depends upon the viscosity of the oil or other fluid in the suspension and also upon the velocity of the suspension. Because of this memory feature, the display panel is ideal for the presentation of plane or missile tracks. The persistence of brightness of the phosphor in an ordinary cathode ray tube is generally only a fraction of a second and therefore too short to satisfactorily display plane tracks. However, if the tracking image on the face of a cathode ray tube is projected onto the rear side of the display panel 1 in which the persistance of vision may be several seconds or longer, very satisfactory plane tracks may be displayed. An observer can of course alter the length of these plane tracks at will by simply increasing or decreasing the translatory velocity of the suspension. Also by momentarily sharply increasing the speed of the pump 10, complete erasure of an entire display can be quickly effected.

If the elongated particles such as needles are very fine so as to approach colloidal dimensions in size then the Brownian motion of the particles becomes a major disorienting and erasing factor. if a fluid chamber such as the chamber 14 of FIG. 2 or chamber 53 of FIG. 3 was not provided with a pump and circulating means for circulating the suspension through the chamber useful displays could still be formed if the elongated particles were fine enough. However, a display panel that is not provided with means for producing a translatory velocity of the suspension will in general have the disadvantage of not being able to produce displays with as high degree of contrast between the image and non-image areas as those panels in which means are provided for producing a translatory velocity of the suspension that is capable of producing an orienting force on the particles.

The fluid chambers employed in the display panels of this invention should preferably have their inside surfaces coated with an electrically insulative material. Thus in FIG. 3 there is shown a thin insulative coating 60 covering the electrically conductive layer 52. In a similar manner the electrically conductive layer 12 shown in the display panel embodiment of FIG. 2 should preferably be covered with a thin, transparent, insulative coating. The panels can be made to operate effectively without these insulative inside coatings but it has been observed that improved displays are obtained when the inside surfaces of the suspension chambers are electrically insulative. Fine particles sometimes tend to stick to the bare electrically conductive layers but this stickiness is considerably reduced if the conductive layers are coated with an insulative film.

The cause of this stickiness is believed to be related to the phenomenum of mirror image forces.

The display panels and procedures described herein are capable of producing not only high contrast black and white displays but also tonal displays containing all the tonal gradations of a relatively high quality pictorial display such as, for example, a television display.

There are many photoelectric materials that may be used in the display panels of this invention to convert projected light signals into electrical signals. In addition to photoconductive materials there are photoemissive and photovoltaic materials that may be employed. By way of example, a photoemissive layer such as described in my U.S. Pat. No. 2,808,328, issued on Oct. 1, 1957 may be used in the display panel embodiment of FIG. 3, instead of the photoconductive layer 58 and semiconductive layer 59.

The term "light" is broadly used in the specifications and claims to include any electromagnetic radiation, including infra-red, ultraviolet and X-ray radiation, that activates the photoelectric layer sufficiently to produce a useful electrical signal.

The term "transparent, electrically conductive layer" is used broadly to include any transparent electrically conductive layer such as a Nesa layer, or a very thin, light permeable metallic layer or a very fine, light permeable metallic or other conductive screen with spaces between the meshes for light to pass through. For structural reasons this "transparent, electrically conductive layer" may be bonded to, or at least in contact with, a transparent, electrically insulative member such as a conventional glass or plastic plate. The transparent, electrically conductive layer need not be a solid but may take the form of an ionized liquid. If the conductive layer is an ionized liquid then a clear protective sheet such as a clear protective plastic sheet should, of course, be used between the ionized liquid layer and the suspension in the fluid chamber. As an example, the outside front surface of the front glass plate 11 in FIG. 2 may be kept moist with a film of water. This water film then substitutes for the Nesa layer 12.

The term "thin particles" is intended to include rod-like particles, such as needles, and also flat particles such as flakes. In the same way, the term "elongate or elongated particles" is intended to include particles with at least one long axis, i.e., needles or flakes.

The display system of FIG. 1 employs the photoelectric means of FIGS. 2 or 3 to establish a pattern of electric fields across the fluid chamber and the small elongated light gating particles suspended in the fluid in the fluid chamber act to convert that pattern into a visible image. There are, however, other ways by which the electrical field pattern can be formed. For example, the ionic discharge means described in my U.S. Pat. No. 3,210,757 may be used to establish the electric field pattern. Another way of forming the field pattern is to cover the rear surface of the fluid chamber with a matrix of square conducting plates electrically insulated from one another and to connect each plate to signaling means which can, on command, apply a suitable voltage to the plate.

A variation of this matrix of square plates is to employ shaped conducting plates on the rear of the fluid chamber. For example, for advertising purposes, there may be four plates shaped and positioned to form the word "COLA". Then by applying a suitable voltage to these four letters the word COLA can be flashed on and off.

The fluid chamber, depicted in FIG. 2 with its inlet and outlet reservoirs, is an example of a fluid chamber that may be used with the type of electric field generating means employing shaped metallic electrodes or a matrix of square electrodes. Upper reservoir 7 and lower reservoir 8 extend across the entire width of the panel. Where the fluid suspension is circulated by the pump 10 (FIG. 1) to cause the suspension to enter the chamber through conduit 9 and be withdrawn through conduit 26, the suspension is passed through the upper port 27 and because this port is thin and extends across the width of the fluid chamber the suspension will leave the port 27 and enter the fluid chamber as a thin broad ribbon or sheet. It will continue to flow down the chamber as a thin broad smoothly flowing laminar-like sheet and be exhausted from the chamber through lower port 28 as a thin broad sheet without undue distortion. The flow is somewhat analogous to a sheet of paper being unrolled from a supply roller and then at a further point in its traverse being rolled up again by a rewind roller. If the entrance and exit ports 27 and 28 to the fluid chamber are constructed so that they do not extend across a substantial portion of the width of the chamber, the suspension will not enter and leave the chamber as a broad ribbon but, rather will drastically diverge from the entrance port and drastically converge at the exit port, causing the velocity of the suspension to vary greatly in different regions of the chamber. This would produce non-uniform erasing rates in the various regions of the chamber which for display purposes could be undesirable.

Of the many advantages in having the suspension flow as a broad ribbon-like stream, one is that the erasure time is relatively constant in all areas of the display panel because the velocity of flow is relatively constant throughout the fluid chamber except for the meandering of the stream which is discussed below. Further, because the flow of the suspension causes the visual image produced by the electrical pattern of charge behind the fluid chamber to be slightly displaced from the electrical image, the displacement being in the direction of the fluid flow and approximately proportional to the velocity of the flow, a broad ribbon-like stream causes the displacement to be substantially constant throughout the panel and therefore unobjectionable. With an uneven non-ribbon-like flow the displacement is not uniform and results in distortion of the visual image. Moreover, since the velocity of flow causes the suspended elongated particles to align themselves parallel to the viewing surface of the panel, the velocity of flow has a considerable influence on the brightness of the image. For the image areas of a display to appear uniformly dark and the non-image areas uniformly bright, the velocity of the fluid flow throughout the chamber should be as uniform as possible. This is particularly true in the case where the suspension is made to flow simultaneously with the applications of the electric field patterns in the fluid chamber.

The orientation of the flakes affects the effective viscosity of the suspension. In the image areas where the flakes are predominately perpendicularly oriented the effective viscosity of the suspension is considerably greater than in the non-image areas where the flakes have a more parallel orientation. This causes the stream flowing down the fluid chamber to flow more rapidly in the non-image areas then in the image areas. Thus portions of the thin broad ribbon stream flowing down the fluid chamber may to some degree meander in a lateral direction as these portions tend to partly flow around the image areas. Since the image areas keep changing the meanderings or perturbations in the flow keep changing with time. Thus, although the suspension is introduced into the field chamber as a thin broad smooth ribbon-like stream and withdrawn from the fluid chamber as a thin broad smooth ribbon-like stream it is to be understood that there may be perturbations in this ribbon-like stream as the stream descends. These perturbations will be a function of the rapidity with which the image patterns are formed and erased and also on the composition of the suspension; the larger and more concentrated the flakes the greater the perturbations.

The term "broad smooth thin ribbon-like stream" as used in this application is intended to include broad thin streams that may have perturbations present. These perturbations refer of course to simple mild meanderings of the flow and not to eddying or other types of rough swirling or turbulent flow.

FIGS. 4 and 5 show cross-sections of a fluid chamber having inlet ports 33 and outlet ports 34. The suspension flows through a circulation system that employs a pump 35 whose output is connected to a manifold 36 having ducts leading to the inlet ports. The intake of the pump is connected by a similar manifold to the outlet ports 34. Narrow guide vanes 37 divide the chamber into compartments to aid in insuring that the suspension will flow smoothly down the chamber as a thin laminar-like sheet. The vanes are preferably narrow strips so as to be almost invisible to an observer. Although the chamber is divided into compartments by the vanes, the suspension flow can be considered, for display purposes, to be one broad smoothly flowing sheet extending from one side of the fluid chamber to the other. Despite the divergence of the suspension flow from the inlet ports and the convergence at the outlet ports, the divergence and convergence occurs within a relatively short distance of the top and bottom of the fluid chamber so that the main portion of the fluid chamber is free from diverging or converging flow. Where it is desired to construct a display panel that is not rectangular, but has some odd shape such as a barrel shaped structure, the guide vanes may be slightly bowed rather than precisely straight and parallel. For a display system to produce precision displays it is generally advantageous to have the suspension flow as a smooth ribbon in substantially straight parallel lines of flow. There are many cases, however, where the display requirements are less stringent. For example, in an advertising display the guide vanes may be somewhat diverging or converging without detracting from the usefulness and acceptability of the display. In some advertising displays it may even be desirable to have the suspension flow in somewhat diverging or converging paths to add novelty or other interesting effects to the display, or to simply lower manufacturing costs. Therefore, depending on the type of display desired and also on manufacturing tolerances and costs, the term "broad, smoothly flowing ribbon" is intended to include ribbons that may have some converging or diverging characteristics provided these converging or diverging characteristics are sufficiently mild so as not to detract from the usefulness of the display.

FIGS. 6 and 7 depict a fluid chamber similar to the one shown in FIG. 4 except that the chamber is horizontally compartmented and the suspension flows in a generally horizontal direction. At one side of the suspension chamber are inlet ports 40 and at the other side are outlet ports 41. Thin guide vanes 42 aid in producing a suitable ribbon-like flow. The vanes divide the fluid chamber into individual compartments or zones and an individual pump can be provided for each compartment. In FIG. 7 one such pump 43 is shown connected to the inlet port and the outlet port of compartment 44. In addition flat metallic electrodes 45, mounted on the rear side 46 of a fluid chamber, may be used to create an electric field pattern across the fluid chamber. Electric signals of a suitable voltage and frequency and originating from a suitable signal transmitting source, which may be simply a voltage supply means and a set of switches, are fed to the individual plate electrodes through connecting wires 47. The front side of the fluid chamber 48 is transparent and is maintained at ground potential by a Nesa or other transparent conductive coating, in the manner previously described. Thus a pattern of electric fields may be created across the fluid chamber between the plate electrodes 45 and the front wall of the fluid chamber. The electrodes 45 may be transparent to permit the display to be viewed by transmitted light if so desired.

An important advantage in having horizontal compartmentation where each compartment is sealed off from the others is that the hydrostatic pressure of the suspension in each compartment can be individually regulated and isolated from the hydrostatic pressure in the other compartments. For example, the pressure in each compartment may be maintained at approximately atmospheric pressure. Then there will be no great pressure within the fluid chamber tending to unduly stress and fracture the front and back walls of the fluid chamber. If the suspensions in the various compartments were not hydrostatically isolated from one another, the hydrostatic pressure in the lower portions of the fluid chamber would be approximately equal to the hydrostatic pressure at the bottom of a column of suspension that was as high as the entire suspension chamber. This pressure could be very large and could easily rupture the fluid chamber.

There is another advantage in having individual pumps associated with each compartment. For advertising purposes, for example, it can sometimes be desirable to divide the display into segments and to erase these segments sequentially rather than the complete display all at one time. If these segments are chosen to be horizontal strips, then the compartments, with their individual pumps, are ideally suited to perform the functions of these strips. Then if, for example, erasing forces are applied to the compartments sequentially starting at the top compartment, there will appear to an observer the interesting effect of an erasing shade being drawn down over the display.

Although the segregation of pressures within each compartment can best be achieved by the use of individual pumps and ducts associated with each compartment, it is to be noted that other pressure control systems can be substituted for the individual pump system.

In special cases where selective erasure of a portion of a compartment is desired the fluid flow within the compartment can be made to proceed, for example, from both ends towards a common outlet port at the center of the compartment. Another method of segregating the pressures in the different horizontal compartments so that the pressures in the lower compartments are not excessive is to have the vanes 42, as shown in FIG. 9, constructed slightly shorter than the width of the panel so that the vanes are, say, an inch short of reaching the left edge of the panel and also an inch short of reaching the right edge of the panel. Then if light gating fluid is introduced at the top of the panel and withdrawn at the bottom it will flow down the one inch wide channel on the left side and also down the one inch wide channel on the right side. If the flow rate is properly adjusted, then the viscous drag of the fluid flow in these two channels can be made to just compensate for the weight of the flowing fluid so that the fluid pressure in all the compartments will be approximately the same. Thus the lower compartments will not have excessively high pressures compared to the upper compartments. If the downward flowing fluid streams in the two side channels are similar, there will then be no pressure difference between the fluid at the left hand end of a compartment and the fluid at the right hand end of that same compartment and the fluid within the compartments will be relatively static. For some display applications this static condition of the fluid within a compartment can be desirable. This static condition can be even more insured by partially enclosing the compartments at their ends. This can be done by constructing the horizontal vanes with small extensions at their ends that point upwards and downwards a short distance. Thus each vane will resemble the capital letter H with the horizontal line or bar of the H being long and the two vertical bars on either side being quite short. These short vertical extensions of each vane can be made to almost meet the respective end extensions of the next higher or lower adjacent vanes leaving but a small opening between a compartment and either of the side channels. With this arrangement of vane extensions the fluid in each compartment can be caused to be quite static yet since there is some communication between the compartments and the side channels the hydrostatic pressure in a given compartment will be determined by the pressure of the fluid in the channels at a point in each of the channels adjacent the two small open ends of the compartments. Since this pressure can be maintained at close to atmospheric pressure by suitably controlling the rate of fluid flow in the two channels so that the viscous drag supports the weight of the fluid there will be no undue stresses on the front and rear walls of the display panel and there will be substantially no bulging of these walls toward or away from one another. If in addition to this equalization of pressures it is also desired to have a lateral flow within the compartments, say, from left to right, then the fluid can be introduced near the upper left hand corner of the panel and withdrawn toward the right side of the bottom of the panel. If this is done then the vanes should not have any side extensions at their ends.

There are at least two important reasons for imparting a smooth generally laminar-like flow to the suspension of elongated light gating particles in the fluid chamber; one, to cause the flakes, needles or other elongated particles in the non-image areas of the display where the electric fields are relatively weak or even zero to orient themselves in a direction parallel to the viewing surface of the display panel, and two, to cause a smooth, directional erasure of the image in the image areas of the display when one desires this image to be erased. This erasure should not be a haphazard erasure with the flakes or other elongated particles being rotated in completely random directions but a controlled, directional erasure in which the flakes are rotated toward a direction which is parallel to the viewing surface of the display panel. This controlled, directional erasure makes for a smoother, more efficient and complete erasure because each flake near the surface of the fluid chamber is rotated in the desired direction.

It is to be noted that the directional erasing described above is quite different from the erasing that would be produced by randomly stirring up or agitating the suspension or by forcing the suspension through the fluid chamber in a turbulent manner. Uncontrolled mixing tends to produce turbulence and eddies and other types of uneven flow. A turbulent flow causes a random orientation of the suspended particles rather than a directional orientation. The presence of eddies furthermore causes a display to have an unwanted mottled or striated appearance of light areas alternating with dark areas with the striations located according to the positions of the eddies. One of the advantages of a thin fluid chamber is that a thin chamber is more conducive to a smooth laminar-like flow of the suspension stream than a thick chamber.

To produce a relatively smooth laminar-like flow there are several conditions that should be satisfied; one, the imparted velocity should not be too great, and two, the thickness of the fluid chamber should be small.

For some applications of the display panel it is desirable to have the suspension flow intermittently. That is, the electric field pattern is applied with the suspension essentially motionless or flowing very slowly and then within a second or so that suspension is given a strong translatory velocity parallel to the viewing surface of the display panel and the entire panel is erased. In other applications it is desirable to maintain the suspension at a slow, steady translatory velocity. One advantage of this is that it permits the formation of images in one portion of the display panel simultaneously with the erasing of images in other portions of the display panel. This steady translatory velocity of the suspension not only causes the erasure of the image areas in the display when the exciting signal electric fields are removed from these image areas but it also causes the elongated particles in the non-image areas of the display to maintain their vertical alignment. The term "vertical alignment" refers of course to those display panels in which the translatory velocity of the suspension is in a vertical direction.

The non-image areas of a display panel are seldom completely devoid of electric fields. There almost always exist some stray electric fields in these non-image regions. For example, in the case of a display panel having a matrix of square signal electrodes mounted on its rear side there is always some interelectrode capacitance between these electrodes so that when a signal voltage is applied to one electrode at least some of this voltage appears on the surrounding electrodes. In addition to the deleterious effects produced by these stray electric fields on the light gating particles, the particles will further disorient themselves in a completely field free area partly because of the Brownian motion for the very fine particles and partly because of the tendency of the particles, particularly the somewhat larger particles to settle in the suspension fluid and as they settle to rotate out of their vertical alignment. The magnitude of this steady translatory velocity can be somewhat critical. If it is too slow it will not maintain the vertical orientations of the particles in the non-image areas. If the velocity is too fast it will unduly rotate the horizontally orientated particles in the image areas where the signal electric fields exist. One cannot simply increase the electric field strengths in these image areas to a degree that will overcome the vertical aligning fluid flow forces acting on the particles here since too strong electric field strengths cause an unwanted deposition of the gating particles, particularly the larger non-colloidal particles, on the walls of the fluid chamber.

Thus the velocity of a suspension flowing, for example, in a vertical direction should be of such a magnitude that the average value of the vertical fluid shear orienting forces on the elongated light gating particles is less than the average value of the horizontal orienting forces on these particles in the image areas of the display but greater than the away-from-the-vertical orienting forces on these particles in the non-image areas of the display.

Or more broadly, to include those display panels in which the translatory velocity of the suspension is in a direction other than the vertical, as for example in the FIG. 6 configuration, the velocity of the suspension flowing as a smooth broad ribbon parallel to the face of the display panel should be adjusted to such a magnitude that the average value of the parallel to the face of the panel orienting forces on the elongated light gating particles is less than the perpendicular to the face of the panel orienting forces on the particles in the image areas of the display but greater than the away from the parallel to the face of the panel orienting forces on the particles in the non-image areas of the display.

In determining the velocity with which the suspension should be passed through the fluid chamber there is another criterion that should be taken into consideration. If the suspension is introduced from the top of the fluid chamber and flows in a generally vertical direction to the bottom then if the magnitude of the velocity is properly chosen the retarding viscous forces between the downward flowing suspension and the walls of the chamber can be made to just balance the weight of the descending fluid. That is for each unit volume of the fluid chamber (a unit of volume might be 1 square inch of surface area multiplied by the inside thickness of the fluid chamber) the retarding frictional forces in that unit volume are just balanced by the weight of the suspension in that unit volume. Then the weight of the suspension in the entire fluid chamber will be essentially supported by the viscous drag between the suspension and the walls of the chamber. This velocity can best be maintained by the use of a flow regulating or inhibiting device such as a sturdy mechanical constriction or choke on the inlet side of the fluid chamber. Then, even if the walls of the fluid chamber are flexible and tend to easily bulge out, they will not bulge out more than a small amount because the suspension flow is impeded by the choke. It is also, of course, important to maintain the fluid pressure above the choke at a suitable value. By choosing appropriate dimensions for the choke and also for the thickness of the fluid chamber, it is possible to obtain a velocity of flow which will not only be satisfactory from a weight supporting viewpoint but will also be satisfactory from a display point of view so that there will be good visual contrast between the image and non-image areas. If the fluid chamber is not in a vertical position but tilted at an angle then there is of course a reduced head or weight of suspension to be supported by the viscous drag of the flowing suspension. The amount of the actual weight of suspension to be supported depends upon the angle of the tilt.

In introducing the suspension into the top of the fluid chamber at a measured rate so that the viscous drag supports the weight of the suspension, consideration must also be given to the desired thickness of the ribbon-like suspension stream. If the fluid chamber has flexible walls and the suspension is introduced too rapidly into the top of the chamber then the suspension stream will become dimensionally thicker and also flow faster than is desirable for good displays. Since the viscous drag increases with the velocity of the suspension the additional weight of the thicker descending suspension stream may still be supported by the viscous drag between the suspension and the walls of the chamber; however, the increased velocity and increased thickness of the suspension stream can make good displays impossible.

It is of course important that the walls of the fluid chamber even though flexible, do not unduly bulge out. For high quality displays the ribbon-like stream flowing down the fluid chamber must be kept thin. Thus the rate of entry of the fluid into the top of the fluid chamber should be set so that the weight of the descending fluid is supported by the viscous drag between the suspension and the walls of the chamber and with the internal dimensions of the fluid chamber remaining at approximately the desired value; that is, as the thin ribbon-like stream descends it should remain a thin ribbon-like stream.

The mechanical constriction or choking means should be located at the top of the fluid chamber and extend across the width of the fluid chamber. This choking means may consist of or be incorporated in the entrance port such as entrance port 27 shown in FIG. 2 provided this entrance port is very rigid. Also if this entrance port is not constrictive enough, a fine wire mesh screen may be placed across the entrance port to further reduce the rate of flow of the incoming fluid. This fine wire screen across the entrance port, if firmly attached to the entrance port, can be an aid to the rigid construction of the entrance port.

Another alternative for choking means is to introduce the display fluid into the top portion of the fluid chamber through many short thin tubes arranged in a line extending across the top of the fluid chamber. These thin tubes will then constitute the choking means. The display embodiment shown in FIG. 4 and 5 illustrate an example of the use of such tubes. These tubes, which lead from the intake manifold 36 to the inlet ports 33, may be considerably more numerous and more closely spaced than the tubes shown in FIG. 4 and 5. Also if the intake manifold 36 is positioned directly against the back of the fluid chamber, the tubes will then be so reduced in length that the entrance ports 33 will be the sole constricting means and then these ports 33 will constitute the chocking means. This construction in which the tubes are so abbreviated in length as to constitute merely holes between the intake manifold and the fluid chamber is a preferred construction. The intake manifold should of course span the entire width of the fuid chamber and also have a large cross-section so that the fluid pressure inside it will be substantially constant. It thus functions in a similar manner as the upper reservoir 7 of FIG. 2. The guide vanes 37 although very desirable in some display applications may in other cases be dispensed with. The particular display requirements such as size, precision and quality desired, cost, etc. determine the need for guide vanes.

Causing the choking means to span a major portion of the width of the fluid chamber insures that the fluid flowing down the chamber will flow as a smooth broad ribbon without an excessive diverging flow at the upper end of the chamber.

With the use of a suitable choking means the walls of the fluid chamber can be made very thin. The flexibility of these very thin walls will then not be a major limiting factor for larger display panels. For example a thin sheet of transparent flexible plastic may be used for the front face of the fluid chamber. Then huge display panels such as panels 20 feet by 50 feet or more become practical. In a fluid chamber having a thin flexible front wall and in which there are no spacers or perhaps only a very few spacers between the front and rear wall the rate at which the choke introduces fluid into the fluid chamber determines the separation of the fluid chamber walls, or stated slightly differently, the thickness of the downward flowing fluid ribbon. For most displays there is an optimum thickness for this fluid ribbon that helps insure that the visual contrast between the image and non-image areas will be high. For example, if the fluid is introduced too slowly into the top of a flexible walled fluid chamber then the downward flowing fluid ribbon may be excessively thin with too little distance between the front and rear walls of the fluid chamber and high quality, high contrast displays will be impossible. The optimum thickness for the fluid ribbon depends of course on the type of fluid used. If the fluid is a suspension of particles then a fluid ribbon in which the concentration of particles is low should be dimensionally thicker than a fluid ribbon in which the concentration of particles is high. With the fluid introduced at a satisfactory rate into the top of the fluid chamber it will usually be found that the actual thickness of the fuid ribbon—or stated slightly differently, the actual separation of the fluid chamber's walls, will still vary somewhat over different areas of the fluid chamber. This is partly because the stiffness, smoothness and other physical properties of the walls of the chamber may not be uniform over the entire area of the walls and partly because the effective viscosity of the fluid in the image areas of the chamber where the electric fields are strong is frequently greater than in the non-image areas where the electric fields are much weaker.

In those areas where the effective viscosity is higher the drag of the fluid against the chamber walls will be greater and the fluid will tend to flow more slowly in these areas. Thus the flowing fluid will to some degree tend to pile up immediately over the image areas of the fluid chamber and to at least a small degree temporarily push out the walls in these areas. Thus it is the average value of the separation of the fluid chamber's walls that one is essentially concerned with. The rate of introduction of the display fluid into the top of the chamber cannot of course be excessively high or the fluid will come plunging down the chamber at an accelerative rate of flow and the viscous drag between the fluid and the walls of the chamber will not be sufficient to support the weight of the fluid column.

Thus there are at least three criteria that must be considered together in determining the rate at which display fluid is introduced into the top of a flexible walled fluid chamber. One, the velocity must be suitable to produce a thickness of fluid ribbon that will enable high contrast displays to be made. Two, as discussed previously for suspensions, such as aluminum flake suspensions, there is an ideal velocity of flow for the production of high contrast displays, said velocity relating to the orientation of the flakes in high and low electric fields. Three, the velocity of flow must be satisfactory to permit the fluid drag against the chamber walls to support the weight of the fluid. In general a flow rate can be chosen that will satisfy all three of these criteria.

Fluid chambers can be built with relatively rigid walls like thick plate glass or with very flexible walls like thin plastic sheets. For a small rigid walled chamber the spacing elements that constitute the two thin side walls of the chamber may be sufficient to maintain the proper inside dimensions of the chamber. For a larger chamber it can be desirable to have spacing elements located in the interior of the chamber since the rigid walls cannot be 100% rigid. These interior spacing elements may even be guide vanes. For a very flexible walled chamber there again can be some spacing elements in the interior of the chamber in addition to the two side walls that may serve as spacing elements. If the rate of flow of the display fluid into the top of the chamber is properly set, the number of interior spacing elements needed can then be kept at a minimum or even dispensed with completely both for the case of the rigid and flexible walled chambers.

The viscous drag forces that support the weight of the fluid may, to a small degree, be augmented by connecting the upper reservoir of the fluid chamber, such as reservoir 7 in FIG. 2, to a mild vacuum source. Although this mild vacuum insures that the front and rear wall of the suspension chamber are pressed against any spacers used for separating the front and rear walls of the chamber and thus help maintain the proper spacing between the front and rear walls the vacuum is a very imperfect way of supporting the weight of the fluid inside the suspension chamber because it will overcompensate for the fluid pressure at the top of the chamber and undercompensate for the fluid pressure at the bottom of the chamber. The viscous drag forces of the descending fluid must be relied upon for the major support of the weight of the fluid inside the fluid chamber.

Another type of light gating substance that may be used in the fluid chamber of the display panel and which is quite different in composition from the suspensions previously discussed, is the liquid crystal type of display fluid. This fluid is in general made up of long thin molecules that tend to align themselves parallel to one another in an orderly fashion as in a crystal. However the bonding between adjacent molecules is weak so that the molecules can slip past one another, thus causing the entire mass of molecules to have fluid characteristics. Thus this type of material has been designated as "liquid crystals". When this crystalline fluid is subjected to an electric field the molecules therein alter their orientations producing thereby visual changes in the fluid. Thus this crystalline fluid may be usefully employed in the fluid chambers of display panels.

One particular class of liquid crystals are designated as nematic crystals. When these nematic liquid crystals are in an undisturbed quiescent state they are clear and transmit light but when agitated by ionic electric currents, for example, the crystal alignment is disrupted and the liquid becomes opalescent and reflects light. Thus a display can be formed by selectively applying electric fields across a fluid chamber containing these liquid crystals. However, since rather substantial electric currents, such as several microamperes per square inch, are usually required to disrupt the crystal alignment, the opaque plastic sheets or layers used as the rear liner for the fluid chamber, (such as layer 16 of FIG. 2 or sheet 55 of FIG. 3) should in general be at least partially electrically conductive in the direction normal to the flat surface of the fluid chamber. This may be accomplished by embedding small metallic or graphite particles in the above mentioned opaque layer. Preferably these particles should be large enough to span the thickness of the layer so that there is a continuous conductive path through the layer. As an alternative procedure the opaque layer 16 (and 55) for example may be composed of a black semiconductive paint that is equally conductive in all directions. The paint is applied as a very thin coat to cause its electrical resistance in the direction normal to its surface to be quite small because of the thinness of the coat while its resistance in the lateral direction is great enough to prevent any unwanted spreading of the current in this direction. This paint, by way of example, may be composed of a fine graphite, or lampblack in a resinous binder. Thus with the use of this partially conductive paint a heavy flow of current can flow from the rear conductive layer 21 to the front conductive layer 12 of FIG. 2 in the image areas of the display panel where the photoconductive layer 17 is rendered conductive by the projected light image. The liquid crystalline fluid, being partially electrically conductive, can pass current between the front and rear walls of the suspension chamber. The opaque paint or other protective layer over the photoconductive layer may in some cases be dispensed with entirely although this is generally not desirable since this protective layer blocks out the ambient room light that normally would enter the display panel from the front side and impinge upon the photoconductive layer. Reference is made to the November 1968 issue of Electronics World and also to Electronics Design Sept. 13, 1970 Volume 18 No. 19 for a discussion of this liquid crystal display fluid.

A liquid crystal display need not be limited to those systems requiring large ionic currents. A liquid crystal display system utilizing considerably smaller ionic currents can under some circumstances still be made to produce useful displays. Thus the display panel shown in FIG. 2 and 3 in which the rear liner of the fluid chamber is an opaque, electrically insulative plastic sheet (such as sheet 55 or 16) can be made to produce readable displays when the fluid chamber contains a liquid crystalline material. When employing this crystalline fluid, the alternating current voltage supply that powers the panel, such as voltage supply 24, should be made to supply voltages at rather high frequencies so as to increase the alternating currents in the crystalline fluid.

The molecules in most liquid crystalline materials are rather long and thin and have sometimes been described as being elongated or cigar shaped although they may be unsymmetrical with protruding bulges or they may be thin principally in one dimension so that they are more flake shaped rather than cigar shaped. A crystalline fluid containing these thin molecules when caused to flow very slowly through a thin fluid chamber in a direction parallel to the face of the chamber will produce a shear action that tends to align the molecules therein in a direction parallel to the fluid flow i.e. parallel to the face of the chamber. When electric fields are then applied perpendicular to the face of the chamber, the molecules reorient or disorient themselves and a useful display is formed with a large visual contrast between the image and non-image areas.

There are many types of liquid crystalline materials and the mechanism by which they function is in many cases still not clear. It has even been conjectured that minute gas bubbles may play a role in the dynamic display action of liquid crystals. This invention is not intended to be limited to particular molecules or particles but is intended to include liquid display fluids in general. Therefore in the claims the term "light gating fluid" or "electric field responsive light gating display fluid" is intended to include liquid suspensions of thin light gating particles as well as other electrically sensitive light gating liquids such as liquid crystals. Furthermore when the light gating fluid is referred to as having or containing thin particles that rotate in an electric field it is to be understood that these particles may constitute essentially the entire mass of the fluid as in the case of liquid crystals, or the thin particles may simply be suspended in a fluid medium such as aluminum flakes in oil.

Guide vanes such as shown in FIGS. 4 and 6 may also be advantageously used in a fluid chamber employing liquid crystalline fluids. In addition the hydrostatic pressure of the liquid crystalline fluid in the fluid chamber can be compensated for by allowing this fluid to slowly seep down inside the chamber. If this liquid crystalline fluid is slowly introduced into the top of the chamber as a thin broad ribbon and withdrawn at the bottom of said chamber and if the entry rate is so adjusted that the retarding viscous forces between the downward flowing fluid and the walls of the chamber substantially balances the weight of the descending fluid then there will essentially be no hydrostatic pressures inside the chamber tending to push the walls of the chamber apart. This feature can be quite important when it is desired to maintain close tolerances of the inside thickness of the chamber. Heavy glass plates on the front and rear walls of the chamber are helpful but not sufficient to insure good dimensional stability inside the chamber.

There are many molecules that are applicable to light gating fluids which are long and thin but asymmetric with a protruding chemical radical located on one side of the molecule. Furthermore this radical although located near the end of the molecule may not be directly at the end. If the molecule is dipolar with one of the electrical charges residing in this radical then when this molecule is in an electric field it will only approximately or partially align itself with the electric field lines with the long axis of the molecule making an angle, generally small, with the electric field lines. The Brownian motion of the particles is an additional disorienting factor that prevents the thin molecules from perfectly aligning themselves with the electric field lines. The alignment to the field lines can never be more than approximate or partial. However even with this partial alignment to the field lines very effective displays can still be made.

There are thus many types of electric field responsive light gating display fluids. They all alter the transmission of light striking the fluid according to the electric field strength within the fluid. Included in this category of display fluids are suspensions of small particles that alter their positions or orientations according to the electric field strengths within the fluid and also the liquid crystal types of display fluids such as certain liquid nematic crystals whose optical properties are altered according to the electric field strengths within the fluid.

As has been pointed out a display panel that employs a light gating fluid can be designed to operate more as a current than a voltage device. Thus rather large electric currents can be made to flow from a conductive layer on the rear side of a fluid chamber, through the radiation induced electrically conductive areas in the adjacent photoconductive layer, and then through the light gating fluid in the fluid chamber to the conductive layer on the front side of the display panel. These currents will of course cause the formation of an electric charge pattern within the photoconductive layer which in turn produces an electric field pattern within the fluid chamber which drives the electric current through the fluid in the fluid chamber. Thus the terms "electric charge pattern" and "electric field pattern" are intended to apply to display systems which more closely resemble current rather than voltage devices and also to display systems which come closer to being a voltage rather than a current device.

This invention applies to fluid light gating materials which are essentially liquid in character and not gaseous. This invention does not apply, for example, to aerosols in which small particles are suspended in a gaseous medium, but it does apply to liquids in which tiny gas bubbles are entrained. The suspending medium, when there is a suspending medium, must be a liquid. Thus, this invention applies to suspensions of thin particles such as aluminum flakes in an oil or other liquid, and also to liquid crystals.

This invention relates essentially to a rapid action display process. It applies to the display art where electric fields selectively alter the transmission or reflectance of light striking a light gating fluid by altering the internal state of the display fluid. This may consist of altering the alignments or groupings of the particles therein. A distinctive feature of the invention is the retention in the fluid of the light gating particles as contrasted to those processes where visual images are formed by selectively depositing charged particles on a surface, as in the xerographic process. These charged particles selectively deposited on a surface might even be later removed and redeposited on another portion of the surface to produce a different design but this technique of forming images is still essentially a print-out, deposition type of process and as such is not intended to be included in this invention.

This invention does not apply to photochromic displays inasmuch as photochromic materials depend upon radiant energy to alter their state. In contrast, this invention relates to displays which employ materials that require electric fields to alter their state.

What is claimed is:

1. A light reflective display system comprising:
    a liquid suspension of fine, electric field responsive, light gating particles;
    a panel adapted to having its front viewing surface illuminated, the panel including a suspension chamber formed between a transparent front wall and a rear wall that is closely spaced from the front wall, the front wall including a transparent, electrically conductive layer, the suspension chamber having an inlet duct supply means and an outlet duct exhaust means arranged to permit the suspension of light gating particles to flow through the chamber as a thin, broad, smooth ribbon;
    means for applying a pattern of electric potentials to the rear wall of the suspension chamber to thereby produce an electric field pattern within the suspension chamber;
    and means to cause the suspension of fine particles to flow through the suspension chamber as a thin broad smooth ribbon.

2. A display system according to claim 1, wherein the light gating particles are thin and produce the light gating action by rotating in an electric field to present a different aspect to the light.

3. A display system according to claim 2, wherein the light gating particles are thin and tend to rotate into logitudinal alignment with the direction of an applied electric field whereby the particles form a display image when subjected to a pattern of electric fields within the suspension chamber.

4. A display system according to claim 3, wherein the interior surfaces of the front and rear walls of the suspension chamber are electrically insulative.

5. A display system according to claim 3, wherein the inlet duct supply means connects with the upper end of the suspension chamber and the outlet duct exhaust means connects with the chamber's lower end, and the means to cause the suspension to flow through the chamber further causing the suspension to enter the chamber's upper end at a rate such that the component of the weight of the suspension in the chamber that is in the direction of suspension flow is supported to at least a large degree by the viscous drag between the flowing suspension and the walls of the chamber to substantially reduce the pressure within the chamber whereby the walls of the chamber do not unduly bulge away from one another.

6. A display system according to claim 3 wherein at least one of the walls of the suspension chamber is at least partly flexible and the inlet duct supply means connects with the suspension chamber's upper end through a flow inhibiting means that stretches across the upper end of the suspension chamber so that the suspension flows down the chamber as a thin broad smooth ribbon with the thickness of the ribbon in the chamber being at least partly determined by the flow inhibiting means.

7. A display system according to claim 3, wherein long thin guide vanes are disposed in the suspension chamber, the guide vanes extending in the direction of flow of the suspension of fine particles.

8. A display system according to claim 7, wherein the guide vanes extend laterally to form a plurality of horizontal compartments elevated one above the other in the suspension chamber, and means are provided to segregate the suspension pressures in the compartments.

9. A display system according to claim 8, wherein the suspension pressures in the compartments are segregated by providing at least one separate pump for each compartment to produce the suspension flow in that compartment.

10. The method of forming a bright visual display on the front face of a display panel which comprises:
    1. introducing a liquid suspension of small thin electrically rotatable, light gating particles in a broad smooth thin ribbon-like stream between a front, transparent, electrically conductive surface and a rear surface closely spaced thereto;
    2. producing an electrical charge pattern comprising image and non-image areas adjacent the rear surface to thereby produce an electric field pattern of image and non-image areas within the suspension, the electrical field pattern being effective to rotate the light gating particles selectively toward a direction that is perpendicular to the front surface according to the electric charge pattern to thereby produce a visual pattern on the front face of the display panel that relates to the electric charge pattern; and 3. causing the velocity of the suspension during at least a portion of the display operation to have a value such that in those areas of the display where the particles are not acted on by strong electric fields an aligning force is produced on the particles in the direction of parallelism with the front surface of the display panel sufficient to cause a substantial number of the particles to move toward parallelism with the front surface so that the light striking these areas of the display is more strongly intercepted by the particles.

11. The method of forming a visual display according to claim 10 wherein
the suspension is introduced at the top of the display panel and withdrawn at the bottom;
and further
4. causing the rate at which the suspension is introduced into the display panel to be such that the component of the weight of the descending suspension stream in the direction that the stream is moving is substantially supported by the viscous drag between the suspension stream and the front and rear surfaces in contact with the suspension.

12. The method of forming a visual display according to claim 10, further including the step of
4. coincident with step 2, maintaining the suspension static or at a very low velocity.

13. The method of forming a bright visual display on the front face of a display panel which comprises:
1. introducing a liquid suspension of small thin electrically rotatable light gating particles in a smooth thin broad ribbon-like stream between a front, transparent, electrically conductive surface and a rear surface closely spaced thereto;
2. producing an electrical charge pattern comprising image and non-image areas adjacent the rear surface to thereby produce an electric field pattern of image and non-image areas within the suspension, the electrical field pattern being effective to rotate the light gating particles selectively toward a direction that is perpendicular to the front surface according to the electric charge pattern to thereby produce a visual pattern on the front face of the display panel that relates to the electric charge pattern; and
3. causing the velocity of the suspension to be such that the average value of the parallel to the front face orienting forces on the thin light gating particles is less than the perpendicular to the front face orienting forces on the particles in are strong image areas of the display where the electric fields are strong but greater then the away from the parallel to the front face orienting forces on the particles in the non-image areas of the display where the electric fields are weaker or even non-existent.

14. A light reflective display system comprising:
1. a liquid suspension of fine, electric field responsive, light gating particles;
2. a panel adapted to having its front viewing surface illuminated, the panel including
 a. a thin suspension chamber for containing the suspension of light gating particles, said suspension chamber having a transparent front wall and a rear wall that are closely spaced from one another, said front wall including a transparent electrically conductive layer and said rear wall including a photoelectric layer;
 b. an electrically conductive second layer adjacent to the photoelectric layer,
3. means for applying electric potentials to the aforesaid electrically conductive layers; and
4. means for projecting an electromagnetic image pattern onto the photoelectric layer to cause an electric charge pattern to form within the photoelectric layer to thereby produce an electric field pattern within the suspension chamber, said electric field pattern acting on the suspension of light gating particles to form a visual display.

15. A display system according to claim 14, in which the light gating particles are thin particles adapted to produce their light gating action by rotating in an electric field to present a different aspect to the light.

16. A display system according to claim 15 wherein the electric potential means delivers an alternating current voltage to one of the electrically conductive layers.

17. A display system according to claim 15 wherein the inside surface of the rear wall is coated with a substantially electrically insulative material.

18. A display system according to claim 15 wherein the inside surface of the front wall is coated with a transparent electrically insulative material.

19. A display system according to claim 15 wherein the photoelectric layer is a photoconductive layer with non-linear voltage-current characteristics.

20. A display system according to claim 15 wherein the photoelectric layer is a photoconductive layer and the rear electrically conductive layer has a discontinuous surface with non-conductive areas interspersed with conductive areas to thereby cause the electric field lines emanating from said rear electrically conductive layer to be bunched together according to the spacings of the conductive areas.

21. A display system according to claim 20 in which the rear electrically conductive layer is an electrically conductive grid and the grid's conductive elements are very thin in both width and depth with the openings between the grid's conductive elements being large compared to the width of the conductive elements.

22. A display system according to claim 21 in which the photoconductive layer is substantially flat and very thin to produce an electrical charge pattern by conducting electrical charge almost solely in a direction parallel to the face of the panel.

23. A display system according to claim 14 wherein the suspension chamber has inlet and outlet ducts arranged to permit the suspension of light gating particles to flow through the chamber as a thin, broad, smooth ribbon, and means to cause said suspension of fine particles to flow through the suspension chamber as said thin, broad, smooth ribbon.

24. A display system according to claim 23 wherein at least one of the suspension chamber walls has its interior surface coated with a substantially electrically insulative material.

25. A display system according to claim 23 in which the light gating particles are thin particles which produce their light gating action by rotating in an electric field in the direction tending to align the particles with the electric field lines.

26. A display system according to claim 25 wherein the photoelectric layer is a photoconductive layer and the rear electrically conductive layer has a discontinuous surface with non-conductive areas interspersed with conductive areas to thereby cause the electric field lines emanating from said rear electrically conductive layer to be bunched together according to the spacings of the conductive areas.

27. A display system according to claim 26 in which the rear electrically conductive layer is a conductive grid and the grid's conductive elements are very thin in both width and depth with the openings between the grid's conductive elements being large compared to the width of the conductive elements.

28. A display system according to claim 25 wherein the means to cause the suspension to flow through the chamber imparts to the suspension of light gating particles a slow and continuous velocity parallel to the face of the panel to cause the displayed images to be continuously erased and reformed.

29. A display system according to claim 25, wherein the means to cause the suspension to flow through the chambers imparts a velocity to the suspension of elongated light gating particles that is great enough to destroy the perpendicular to the face of the panel fog orientations of the thin particles in the non-image areas but not great enough to destroy the perpendicular to the face of the panel signal orientations of the thin particles in the image areas, said velocity being in a direction that is parallel to the face of the panel.

30. A display system according to claim 25 wherein means are provided for rapidly erasing the display image, said means imparting a strong parallel to the face of the panel velocity to the suspension of light gating particles.

31. The method of forming a bright visual display on the front face of a display panel which comprises the steps of:
 1. introducing a liquid suspension of small, thin, electrically rotatable light gating particles in a thin broad smooth ribbon-like stream between a photoelectric layer and a transparent, electrically conductive layer that is on the front side of the photoelectric layer and closely spaced thereto;
 2. causing the velocity of the suspension during at least a portion of the display operation to have a value such that the velocity produces a definite aligning force on the suspended particles that is in the direction of parallelism with the front face of the display panel; and
 3. projecting an electromagnetic radiation pattern onto the photoelectric layer to thereby produce an electrical charge pattern of image and non-image areas within the photoelectric layer that relates to the electromagnetic radiation pattern to thereby produce an electric field pattern of image and non-image areas extending across the liquid suspension of light gating particles to the transparent electrically conductive layer, the electric field pattern being effective to rotate the light gating particles selectively toward a direction that is perpendicular to the front face of the display panel according to the electrical field pattern to thereby produce a visual pattern on the front face of the display panel that relates to the projected electromagnetic radiation pattern.

32. The method of forming a visual display according to claim 31 and further
 4. causing the velocity of the suspension to have a magnitude such that in the non-image areas the average value of the parallel to the front face orienting forces on the thin particles is greater than the average value of the perpendicular to the front face orienting forces on the thin particles, but in the image areas where the electric fields are strong said orienting forces that are in the direction of parallelism with the front face are less than the orienting forces that are in the direction of perpendicularism with the front face.

33. The method of forming a display according to claim 31 further including the step of
 4. coincident with step 3, maintaining the suspension static or at a low velocity.

34. A display system comprising:
 1. an electric field responsive light gating fluid;
 2. a panel that includes a fluid chamber formed between a transparent front wall and a rear wall that is closely spaced from the front wall, the front wall including a transparent, electrically conductive layer, the fluid chamber having an inlet duct supply means that connects with the upper end of the fluid chamber and an outlet duct exhaust means that connects with the chamber's lower end and with the duct supply means arranged to permit the light gating fluid to flow through the chamber as a thin, broad, smooth ribbon;
 3. means for applying a pattern of electric potentials to the rear wall of the fluid chamber to thereby produce an electric field pattern within the fluid chamber;
 4. and means to cause the light gating fluid to flow through the fluid chamber as a thin, broad, smooth ribbon, said means including means to cause the fluid to enter the fluid chamber's upper end at a rate such that the component of the weight of the fluid in the chamber that is in the direction of fluid flow is supported to at least a large degree by the viscous drag between the flowing fluid and the walls of the chamber to substantially reduce the pressure within the chamber whereby the walls of the chamber do not unduly bulge away from one another.

35. A display system comprising:
 1. An electric field responsive light gating fluid;
 2. A panel that includes a fluid chamber formed between a transparent front wall and a rear wall that is closely spaced from the front wall with at least one of the walls of the fluid chamber being at least partly flexible and with the front wall including a transparent, electrically conductive layer, the fluid chamber having an inlet duct supply means and an outlet duct exhaust means arranged to permit the light gating fluid to flow through the chamber as a thin broad, smooth ribbon and with the inlet duct supply means connecting with the fluid chamber's upper end through a flow inhibiting means that stretches across the upper end of the fluid chamber so that the fluid flows down the chamber as a thin broad smooth ribbon with the thickness of the ribbon in the chamber being at least partly determined by the flow inhibiting means;
3. means to cause this flow to take place;
4. and means for applying a pattern of electric potentials to the rear wall of the fluid chamber to thereby produce an electric field pattern within the fluid chamber which causes the light gating fluid to form a visual display.

36. A display system comprising:
1. an electric field responsive light gating fluid;
2. a panel that includes a fluid chamber formed between a transparent front wall and a rear wall that is closely spaced from the front wall, the front wall including a transparent, electrically conductive layer, the fluid chamber having an inlet duct supply means and an outlet duct exhaust means arranged to permit the light gating fluid to flow through the chamber as a thin, broad, smooth ribbon;
3. the chamber further including long thin guide vanes extending laterally to form a plurality of horizontal compartments elevated one above the other in the fluid chamber, and means provided to substantially segregate the fluid pressures of the compartments;
4. means for applying a pattern of electric potentials to the rear wall of the fluid chamber to thereby produce an electric field pattern within the fluid chamber;
5. and means to cause the light gating fluid to flow through the fluid chamber as a thin, broad, smooth ribbon.

37. A display system comprising:
1. an electric field responsive, light gating fluid;
2. a panel that includes a fluid chamber formed between a transparent front wall and a rear wall that is closely spaced from the front wall,
3. means for applying a pattern of electric potentials to the rear wall of the fluid chamber to thereby produce an electric field pattern within the fluid chamber;
4. partition members extending laterally in the chamber and dividing the chamber into a plurality of compartments elevated one above the other; and
5. a narrow channel running downwards along at least one of the side edges of the chamber, said channel having an inlet port at its upper end for introducing the light gating fluid into the channel and an outlet port at its lower end for withdrawing said fluid, and means to control the rate of flow of the fluid entering the channel so that the component of the weight of the fluid in the direction of the fluid flow in the channel to at least a considerable degree is supported by the viscous drag between the flowing fluid and the walls of the channel and
6. said compartments communicating with said channel whereby the fluid pressures in the various compartments are approximately the same as in those sections of the channel with which the compartments communicate whereby the walls of the chamber do not unduly bulge away from one another.

38. A display system according to claim 37, wherein: the front wall includes a transparent electrically conductive layer.

39. A display system according to claim 37, wherein: the rear wall includes a photoconductive layer and the pattern of electric potentials is formed in this photoconductive layer.

40. A display system according to claim 38, wherein: the rear wall includes a photoconductive layer and the pattern of electric potentials is formed in this photoconductive layer.

41. A light reflective display system comprising:
1. an electric field responsive, light gating fluid;
2. a panel adapted to having its front viewing surface illuminated, the panel including
   a. a thin fluid chamber for containing the light gating fluid, said fluid chamber having a transparent front wall and a rear wall that are closely spaced from one another, said front wall including a transparent electrically conductive layer, said rear wall including a photoconductive layer and a second electrically conductive layer, said electrically conductive second layer being adjacent to the photoconductive layer,
   b. and said second electrically conductive layer having a discontinuous surface with non-conductive areas interspersed with conductive areas to thereby cause the electric field lines emanating from said second electrically conductive layer to be bunched together according to the spacings of the conductive areas;
3. means for applying electric potentials to the aforesaid electrically conductive layers; and
4. means for projecting an electromagnetic image pattern onto the photoconductive layer to cause an electric charge pattern to form within the photoconductive layer to thereby produce an electric field pattern within the fluid chamber relating to the electric charge pattern, said electric field pattern acting on the light gating fluid to form a visual display.

42. A display system according to claim 41 in which the light gating fluid has thin particles adapted to produce their gating action by rotating in an electric field.

43. A display system according to claim 41, wherein the inside surface of the rear wall is thinly covered with a substantially electrically insulative material and the electric potential that is applied to at least one of the electrically conductive layers being an AC potential of sufficiently high frequency to permit a display to form in the light gating fluid.

44. A display system according to claim 41 wherein the inside surface of the front wall is substantially electrically insulative.

45. A display system according to claim 41 in which the electrically conductive second layer is an electrically conductive grid and the grid's conductive elements are very thin in both width and depth with the openings between the grid's conductive elements being large compared to the width of the conductive elements.

46. A display system according to claim 45 in which the photoconductive layer is substantially flat and very thin to produce an electric field pattern by conducting electrical charge almost solely in a direction parallel to the face of the panel.

47. A display system according to claim 46 in which the electrically conductive grid is disposed on the front face of the photoconductive layer.

48. A display system according to claim 47, wherein a thin electrically insulative sheet is disposed on the front face of the photoconductive layer with the grid tightly sandwiched between the front face of the photoconductive layer and the thin insulative sheet.

49. A display system according to claim 48, wherein the photoconductive layer is very thin and rippled with many closely spaced indentations to increase the path length that the electrical charges must take in flowing from the grid out along the photoconductive layer thus reducing the dark currents in the photoconductive layer.

50. A light reflective display system comprising:
1. an electric field responsive, light gating fluid;
2. a panel adapted to have its front viewing surface illuminated, the panel including
   a. a thin fluid chamber for containing the light gating fluid, said fluid chamber having a transparent front wall and a rear wall that are closely spaced from one another with the inside surface of the rear wall being thinly covered with a substantially electrically insulative material, said front wall including a transparent electrically conductive layer and said rear wall including a photoelectric layer;
   b. an electrically conductive second layer adjacent to the photoelectric layer,
3. means for applying electric potentials to the aforesaid electrically conductive layers with the electric potential that is applied to at least one of the electrically conductive layers being an AC potential of sufficiently high frequency to permit displays to form in the light gating fluid;
4. means for projecting an electromagnetic image pattern onto the photoelectric layer to cause an electric charge pattern to form within the photoelectric layer to thereby produce an electric field pattern within the fluid chamber relating to the electric charge pattern, said electric field pattern acting on the light gating fluid to form a visual display relating to the electric field pattern; and
5. said fluid chamber having inlet and outlet duct means arranged to permit the light gating fluid to flow through the chamber as a thin, broad, smooth ribbon, and means to cause said fluid to flow through the fluid chamber as said thin, broad, smooth ribbon.

51. A light reflective display system comprising:
1. an electric field responsive, light gating fluid having thin particles which produce their light gating action by rotating in an electric field in the direction tending to align the particles at least partially with the electric field lines;
2. a panel adapted to have its front viewing surface illuminated, the panel including
   a. a thin fluid chamber for containing the light gating fluid, said fluid chamber having a transparent front wall and a rear wall that are closely spaced from one another, said front wall including a transparent electrically conductive layer and said rear wall including a photoconductive layer;
   b. a second electrically conductive layer adjacent to the photoconductive layer,
3. means for applying electric potentials to the aforesaid electrically conductive layers;
4. said second electrically conductive layer having a discontinuous surface with non-conductive areas interspersed with conductive areas to thereby cause the electrical field lines emanating from said second electrically conductive layer to be bunched together according to the spacings of the conductive areas;
5. means for projecting an electromagnetic image pattern onto the photoconductive layer to cause an electric charge pattern to form within the photo conductive layer to thereby produce an electric field pattern within the fluid chamber relating to the electric charge pattern, said electric field pattern acting on the light gating fluid to form a visual display relating to the electric field pattern; and
6. said fluid chamber having inlet and outlet duct means arranged to permit the light gating fluid to flow through the chamber as a thin, broad, smooth ribbon, and means to cause said fluid to flow through the fluid chamber as said thin, broad, smooth ribbon.

52. A display system according to claim 51 in which the second electrically conductive layer is a conductive grid and the grid's conductive elements are very thin in both width and depth with the openings between the grid's conductive elements being large compared to the width of the conductive elements.

53. A display system according to claim 52, wherein the photoconductive layer is substantially flat and very thin to produce an electrical field pattern by conducting electric charge almost solely in a direction parallel to the face of the panel.

54. A display system according to claim 53 in which the electrically conductive grid and a thin electrically insulative sheet are disposed on the front face of the photoconductive layer with the grid tightly sandwiched between the front face of the photoconductive layer and the thin insulative sheet.

55. A display system according to claim 52, wherein the electrically conductive grid and a thin electrically insulative sheet are disposed on the front face of the photoconductive layer with the grid tightly sandwiched between the front face of the photoconductive layer and the thin insulative sheet and the photoconductive layer being very thin and rippled with many closely spaced indentations to increase the path length that the electric charges must take in flowing from the grid out along the photoconductive layer thus reducing the dark currents in the photoconductive layer.

56. The method of forming a bright visual display on the front face of a display panel which comprises the steps of:
1. introducing a liquid suspension of small thin electrically rotatable light gating particles in a broad smooth thin ribbon-like stream between a front transparent electrically conductive surface and a rear surface closely spaced thereto;
2. while said suspension stream is flowing, producing sequentially a series of electrical charge patterns comprising image and non-image areas adjacent the rear surface, said charge patterns producing electrical field patterns of image and non-image areas within the suspension, the image areas being areas of strong electric fields and the non-image areas of weak or zero electric fields; and
3. during change-overs from one image pattern to a succeeding image pattern causing substantial numbers of the thin particles in those image areas that are being changed over to non-image areas to rotate toward parallel alignment with the front surface so that the light striking these areas is more strongly intercepted by the particles, and accomplishing said rotation by causing the velocity of the suspension to have a value such that in those areas being changed from image to non-image areas a parallel to the front face aligning force is exerted on the thin particles sufficient to cause said substantial numbers of thin particles to move toward parallel alignment with the front face.

57. The method of forming a bright visual display on the front face of a display panel which comprises the steps of:
   1. flowing an electric field responsive light gating fluid in a broad smooth thin ribbon-like stream between a front transparent wall and a rear wall closely spaced thereto and causing the fluid stream to be introduced at the top of the display panel and withdrawn at the bottom at a rate such that the component of the weight of the fluid in the broad smooth thin ribbon-like stream that is in the direction said stream is flowing is substantially supported by the viscous drag between the broad smooth thin ribbon-like fluid stream and the front and rear walls in contact with said stream, whereby the pressure is generally uniform throughout the space between the walls; and while said stream is flowing,
   2. producing a pattern of electrical potentials at the rear wall to thereby produce an electric field pattern of image and non-image areas within the fluid, the electrical field pattern being effective in producing a visual display pattern within the light gating fluid that relates to the electric field pattern.

58. The method of forming a bright visual display according to claim 57, further including the step of:
   drawing out in a forward direction the electric field lines from the pattern of electric potentials by an electrically conductive transparent layer on the front wall to thereby produce an electric field pattern within the fluid with the electric field lines being generally normal to the front wall.

59. The method of forming a bright visual display according to claim 57, further including the step of:
   projecting an electromagnetic radiation pattern of image and non-image areas on the rear wall and by means of a photoconductive layer on the rear wall transforming this radiation pattern into the electrical potential pattern.

60. The method of forming a bright visual display according to claim 58, further including the step of:
   projecting an electromagnetic radiation pattern of image and non-image areas on the rear wall and by means of a photoconductive layer on the rear wall transforming this radiation pattern into the electrical potential pattern.

61. A light reflective display system comprising:
   1. an electric field responsive, light gating fluid;
   2. a panel adapted to have its front viewing surface illuminated, the panel including
      a. a thin fluid chamber for containing the light gating fluid, said fluid chamber having a transparent front wall and a rear wall that are closely spaced from one another, said front wall including a transparent electrically conductive layer and said rear wall including a photoelectric layer;
      b. a second electrically conductive layer adjacent to the photoelectric layer,
   3. means for applying electric potentials to the aforesaid electrically conductive layers;
   4. means for projecting an electromagnetic image pattern onto the photoelectric layer to cause an electric charge pattern to form within the photoelectric layer to thereby produce an electric field pattern within the fluid chamber relating to the electric charge pattern, said electric field pattern acting on the light gating fluid to form a visual display; and
   5. said fluid chamber having inlet duct means that connect with the upper end of the fluid chamber and outlet duct means that connect with the chamber's lower end and arranged to permit the light gating fluid to flow through the chamber as a thin broad smooth ribbon, and means to cause the fluid to flow through the chamber as said thin, broad, smooth ribbon, said means causing the fluid to enter the upper end of the chamber with a rate of flow such that the component of the weight of the fluid in the chamber that is in the direction of fluid flow is substantially supported by the viscous drag between the flowing fluid and the walls of the chamber whereby the pressure within the chamber is generally uniform throughout the chamber.

62. The method of controlling the transmission of light in an electric field responsive, light transmission controlling panel in which the ratio of the amount of light that leaves the panel to the amount that enters the panel can, through the action of an electric field, be greatly altered, which comprises the steps of:
   1. introducing an electric field responsive light gating fluid in a broad smooth thin ribbon-like stream between a front wall and a rear wall spaced at a suitably close distance from each other with at least the front wall being transparent and electrically conductive, and causing the fluid stream to be introduced at the top of the panel and withdrawn at the bottom at a rate such that the component of the weight of the descending fluid in the direction the broad smooth thin ribbon-like fluid stream is flowing is substantially supported by the viscous drag between the fluid stream and the front and rear walls in contact with the fluid stream whereby the pressure between the front and rear walls is generally uniform throughout the space between the walls; and
   2. while said fluid stream is flowing applying and then later removing an electric field between the front and rear walls with the electric field lines being generally normal to the two walls, the electric field being effective in altering the transmission of light in the electric field responsive fluid.

63. The method of controlling the transmission of light of an electric field responsive, light controlling panel according to claim 62, wherein:
   the light gating fluid is a suspension of small thin electrically rotatable light gating particles that tend to rotate into longitudinal alignment with the direction of the applied electric field, and which also, in the absence of an electric field, tend to at least partially align themselves in the direction the suspension stream is flowing.

64. The method of controlling the transmission of light in an electric field responsive light controlling panel according to claim 63, and including the step of:
   further influencing the rate of flow of the suspension in the panel by adjusting the spacing between the front and rear walls so that the suspension flows down between the walls slowly enough to permit substantial numbers of the thin particles to orient themselves in the general direction of the electric field lines whereby the light entering the panel is readily transmitted through the suspension in the general direction of these electric field lines, but this suspension flow should also be rapid enough so that when the electric field is removed the flowing suspension will cause substantial numbers of the thin particles that were oriented in a light transmit direction by the electric field lines to rapidly rotate toward a parallel alignment with the direction the suspension stream is flowing thereby causing the light to be strongly intercepted by these particles.

65. A light transmission controlling system comprising:
1. a liquid suspension of fine thin electric field responsive light gating particles that tend to rotate into longitudinal alignment with the direction of an applied electric field;
2. a panel that includes a suspension chamber formed between a transparent front wall and a rear wall closely spaced from one another, with at least the front wall including a transparent electrically conductive layer, the suspension chamber having an inlet duct supply means and an outlet duct exhaust means arranged to permit the suspension of light gating particles to flow through the chamber as a thin broad smooth ribbon with the inlet duct supply means connecting with the upper end of the suspension chamber and the outlet duct exhaust means connecting with the chamber's lower end, and
3. means to cause the suspension to enter the upper end of the chamber via the inlet duct supply means and to flow down through the chamber as a thin broad smooth ribbon and said means causing the rate of flow of the suspension entering the upper end of the chamber to be such that the component of the weight of the suspension in the chamber that is in the direction of the suspension flow is substantially supported by the viscous drag between the flowing suspension and the walls of the chamber; and
4. means for applying an electric field across the chamber between the front and rear walls to cause the thin particles in the chamber to rotate toward a longitudinal alignment with the electric field lines thereby altering the transmission of light entering the chamber and striking the thin particles.

66. The method of forming a bright visual display on the front face of a display system which comprises:
1. introducing a light gating fluid having thin particles which produce the light gating action by changing their orientation in an electric field in a broad smooth thin ribbon-like stream between a front, transparent electrically conductive surface and a rear surface closely spaced thereto;
2. reducing the velocity of the fluid stream to a very low or zero value and while the stream has this very low or zero velocity producing an electrical charge pattern comprising image and non-image areas adjacent the rear surface to thereby produce an electric field pattern of image and non-image areas within the light gating fluid, the electric field pattern being effective in selectively changing the orientations of the light gating particles according to the electric field pattern to thereby produce a visual pattern on the front face of the display system that relates to the electric charge pattern; and
3. after the visual pattern has been formed causing the velocity of the fluid stream to be increased to alter the orientations of the light gating particles sufficiently to destroy the visual image, and
4. repeating this sequence each time a display is to be formed and erased.

* * * * *